United States Patent [19]
Wilson

[11] Patent Number: 5,896,517
[45] Date of Patent: Apr. 20, 1999

[54] HIGH PERFORMANCE PROCESSOR EMPLOYING BACKGROUND MEMORY MOVE MECHANISM

[75] Inventor: Peter J. Wilson, Leander, Tex.

[73] Assignee: Bull HN Information Systems Inc., Billerica, Mass.

[21] Appl. No.: 08/914,084

[22] Filed: Aug. 18, 1997

[51] Int. Cl.$^6$ .............................. G06F 9/38; G06F 12/08
[52] U.S. Cl. ................................... 395/383; 711/137
[58] Field of Search ........................... 395/383, 566, 395/567, 141; 711/137, 142, 143, 146, 147, 213

[56] References Cited

U.S. PATENT DOCUMENTS

| | | | |
|---|---|---|---|
| 5,353,430 | 10/1994 | Lautzenheiser | 711/117 |
| 5,561,783 | 10/1996 | Vanka et al. | 711/141 |
| 5,742,814 | 4/1998 | Balasar et al. | 395/613 |
| 5,777,629 | 7/1998 | Baldwin | 345/506 |

*Primary Examiner*—Parshotam S. Lall
*Assistant Examiner*—Viet Vu
*Attorney, Agent, or Firm*—Faith F. Driscoll; John S. Solakian

[57] ABSTRACT

The present invention which makes use of knowledge developed at the program writing stage by the programmer or by software tools such as a compiler that some substantial number of data accesses would miss in the cache hierarchy to the detriment of performance and that it would be possible to prefetch the necessary data in parallel with performing useful work. The invention provides a background memory move (BMM) mechanism by which the program can specify such prefetching of data from main memory to a quickly-accessible data cache and by which the program can determine which such prefetches have completed. This mechanism makes it possible to improve the performance of the computer system through the effective use of added concurrency while avoiding the overheads of process-swapping.

34 Claims, 19 Drawing Sheets

TAG TABLE

| TRANSACTION INDEX | DESTINATION ADDRESS 12-22b | LINE BUFFER |
|---|---|---|
| | | |
| | | |
| | | |
| | | |
| | | |

BMM REGISTERS

| TAGS BIT VECTOR |
|---|
| FREE TRANSACTIONS BIT VECTOR |
| COMPLETED TRANSACTIONS BIT VECTOR |
| RETURNED TRANSACTIONS BIT VECTOR |
| TAG REGISTER |
| TRANSACTION REGISTER |

12-22a
12-20

TRANSACTION TABLE

| EXECUTION ADDRESS |
|---|
| |
| |
| |
| |
| |
| |
| |
| |
| |
| |
| |
| |
| |
| |
| |
| |
| |
| |
| |

CPU-BMM INTERFACE REGISTERS

| BUSY INDICATOR |
|---|
| COMMAND |
| rA |
| rB |
| rC |

12-28

BMM-CPU INTERFACE REGISTERS

| BUSY INDICATOR |
|---|
| rD |

12-25

BMM-DCACHE INTERFACE REGISTERS

| BUSY INDICATOR |
|---|
| COMMAND |
| TAG |
| ADDRESS |
| MEMORY BUFFER |

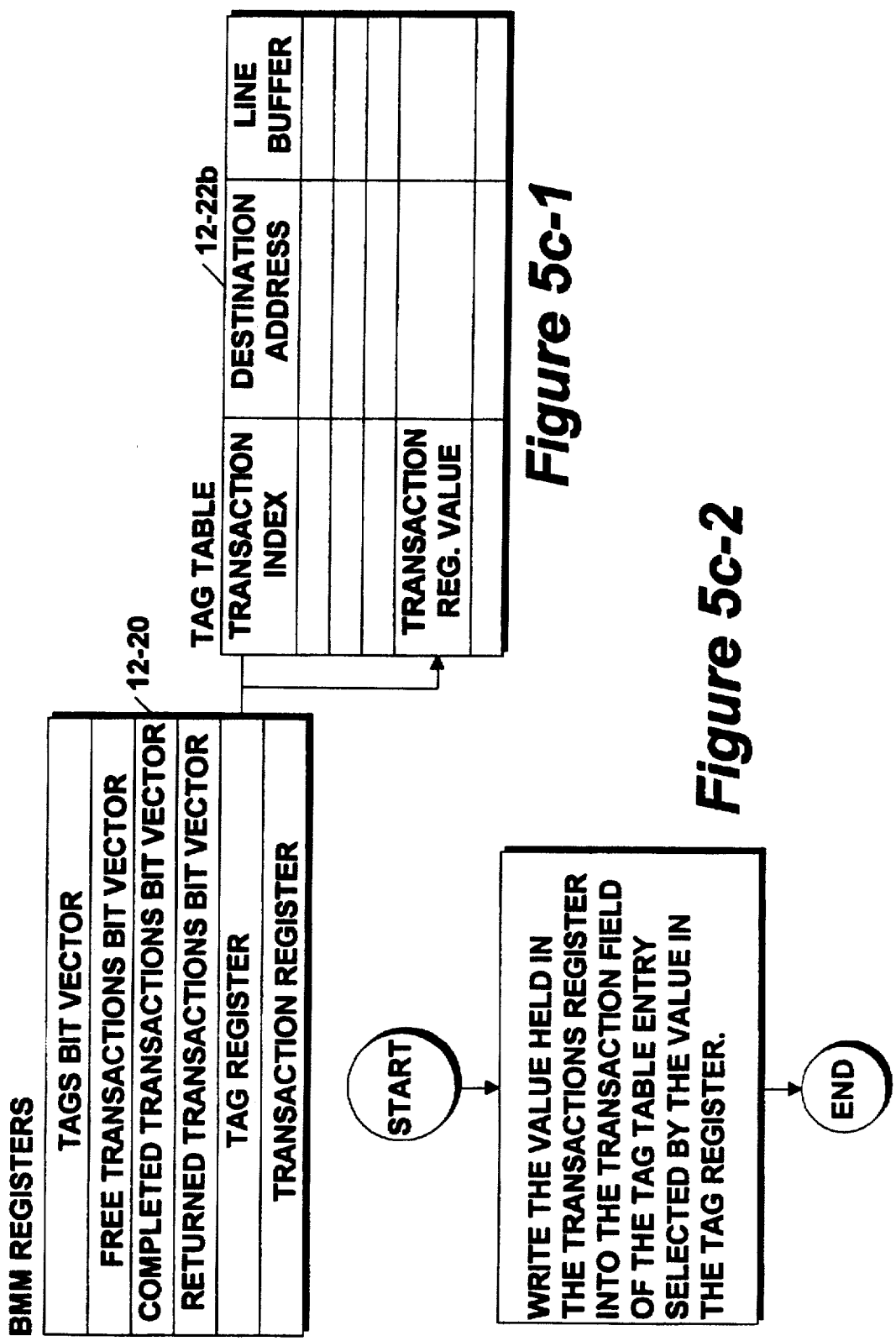

(I)Background Move of N bytes, where N is the cache line length

// on entry, r3 holds source address, r4 holds destination address,
// execution to continue at label ContinueHere // initialize the bmm
    initb r6, r5, r5;
    lealabel r5, ContiueHere;    //Loads address of label into r5
// initiate the move
doMove:
    move r6, r5;    // copy r5 to r6
    bmb r6, r3, r4;    // tell bmm to move stuff
        // exe=r6, src=r3, dest=r4
    blz doMove, r6:    // did bmm accept?; if not, retry
    ...    // other usefull work doPoll:
    tellb r6    // get an execution address
    beqz doPoll, r6;    // poll again if r6 == 0 (ie, no completions)
    jmplr r6;    // otherwise jmp&link to address supplied
    exit;    // all done ContinueHere:
    ... do whatever work
    return;    // return to calling site

*Figure 6c-1*

(ii) Background Move of N bytes, where N is a multiple of the cache line length

// upon entry r3 holds source address, r4 holds destination address, r5 holds number of transfers
// execution to continue at label ContinueHere when all transfers are completed
// initialize the bmm
```
    initb r6, r5, r5;
    lealabel r6, Intermediate;     // loads address of label into r5
    move r7, r6;                   // copy r6 to r7
    move r10, r5;                  // copy number of transfers to r10
// initiate the moves
doMove:
    move r7, r6;                   // recover execution address
    bmb r7, r3, r4;                // tell bmm to move stuff
    blz doMove, r7;                // did bmm accept?; if not retry
    addi r3, r3, LineLength;       // increment pointers
    addi r4, r4, LineLength;
    subi r5, r5, 1;                // decrement xfer count by one
    bgz doMove, r5;                // loop if more transfer to set up
    ...                            // do other useful work
doPoll:
    tellb r6
    beqz doPoll, r6;               // get an execution address
    jmplr r6;                      // poll again if r6 == 0 (ie, no completions)
    exit;                          // otherwise jmp&link to address
                                   // all done
Intermediate:
    subi r10, r10, 1;              // see if all the transfers are completed
    bez ContinueHere;              // if so, go do desired work
    return;                        // otherwise keep polling
ContinueHere:
    ... do whatever work
    return;
```

*Figure 6c-2*

| TAG TABLE | | 12-22b | |
|---|---|---|---|
| TRANSACTION INDEX | SOURCE ADDRESS | DESTINATION ADDRESS | LINE BUFFER |
| | | | |
| | | | |
| | | | |
| | | | |
| | | | |

BMM REGISTERS / 12-20

| TAGS BIT VECTOR |
|---|
| FREE TRANSACTIONS BIT VECTOR |
| COMPLETED TRANSACTIONS BIT VECTOR |
| RETURNED TRANSACTIONS BIT VECTOR |
| TAG REGISTER |
| TRANSACTION REGISTER |

CPU-BMM INTERFACE REGISTERS / 12-28

| BUSY INDICATOR |
|---|
| COMMAND |
| rA |
| rB |
| rC |

BMM-CPU INTERFACE REGISTERS / 12-25

| BUSY INDICATOR |
|---|
| rD |

BMM-DCACHE INTERFACE REGISTERS / 12-26

| BUSY INDICATOR |
|---|
| COMMAND |
| TAG |
| ADDRESS |
| MEMORY BUFFER |

TRANSACTION TABLE / 12-22a

| EXECUTION ADDRESS | TRANSFER COUNT |
|---|---|
| | |
| | |
| | |
| | |
| | |
| | |
| | |
| | |
| | |
| | |
| | |
| | |
| | |
| | |
| | |
| | |
| | |
| | |
| | |
| | |
| | |
| | |
| | |
| | |

*Figure 9a*

TAG TABLE / 12-22b

| TRANSACTION INDEX | SOURCE ADDRESS | DESTINATION ADDRESS | LINE BUFFER |
|---|---|---|---|
| | | | |
| | | | |
| | | | |
| | | | |

BMM REGISTERS / 12-20

| TAGS BIT VECTOR |
|---|
| FREE TRANSACTIONS BIT VECTOR |
| COMPLETED TRANSACTIONS BIT VECTOR |
| RETURNED TRANSACTIONS BIT VECTOR |
| TAG REGISTER |
| TRANSACTION REGISTER |

CPU-BMM INTERFACE REGISTERS / 12-28

| BUSY INDICATOR |
|---|
| COMMAND |
| rA |
| rB |
| rC |

BMM-CPU INTERFACE REGISTERS / 12-25

| BUSY INDICATOR |
|---|
| rD |

BMM-DCACHE INTERFACE REGISTERS 12-26

| BUSY INDICATOR |
|---|
| COMMAND |
| TAG |
| ADDRESS |
| MEMORY BUFFER |

TRANSACTION TABLE / 12-22a

| EXECUTION ADDRESS | TAG TABLE BIT VECTO |
|---|---|
| | |
| | |
| | |
| | |
| | |
| | |
| | |
| | |
| | |
| | |
| | |
| | |
| | |
| | |
| | |
| | |
| | |
| | |
| | |
| | |
| | |
| | |
| | |

*Figure 9b*

HIGH PERFORMANCE PROCESSOR EMPLOYING BACKGROUND MEMORY MOVE MECHANISM

BACKGROUND OF THE INVENTION

1. Field of Use

The present invention relates to data processing systems and more particularly to management of the memory subsystem of such systems through processor enhancements.

2. Related Art

A data processing system comprises, in general, a processor, a memory subsystem and an I/O (input/output) subsystem. The instructions describing the required behavior of the data processing system, together with various working values, are stored in the memory subsystem, and the system operates by the continual action of the processor in fetching instructions in an orderly manner from the memory subsystem and performing the operations specified by them, reading data values from memory and writing them back in accordance with the instructions' requirements.

The overall performance of such a system depends upon a number of aspects. Among the most important are the rate at which the processor can execute instructions and the work done by each instruction. All other things being equal, the more work defined by each instruction and the more frequent the execution of the instructions, the more work that is done per unit time.

The rate at which the processor can execute instructions is the lesser of two values, the rate at which the processor could execute the instructions were the memory subsystem to take no time to deliver the values (whether instructions or data) requested by the processor, and the rate at which the memory system can actually deliver the values. It has long been the case that it is straightforward to build a processor which can execute useful instructions much faster than an economical memory subsystem can manage to deliver them. To mitigate the effects of this throttling of performance by the memory subsystem, computers have long provided private local memories, called caches, for the processor in which copies of recently-used data values and instructions are held and which offer performance matched to the needs of the processors. In a system employing caches, it is expected that the majority of requests for instructions or data that the processor makes of the memory subsystem will be supplied by the cache(s), with only some reasonably small percentage of requests actually having to go to the 'real' memory subsystem. In such a circumstance, the processor will be able to execute instructions at close to its maximum capability a large proportion of the time.

When an instruction access 'misses' in the cache (i.e., must go to the real memory subsystem for the instruction), a conventional processor has no choice but to wait, doing no work, until the memory subsystem delivers the instruction. The time to do this can be sufficient for the processor to have executed several hundred instructions. When a request to read data 'misses' in the cache, the processor is often able to continue work at least for a while, if the program was organized in such a way as to request or prefetch the data some time before it was needed. Except in the case of very regular programs (i.e., programs which have well-defined and well-understood patterns of access to memory, such as those which do most of their work operating on matrices and other regular structures), it is unusual for it to be possible to arrange for there to be several hundred instructions between the request and the use of the data. When a request to write data misses in the cache, there can often be little impact on performance, since the processor may copy the value into a buffer for writing into memory at its own pace and so other work may continue in parallel.

To show the effects of cache misses on performance, suppose that the cache on a hit can supply data immediately, but that the memory takes a time equivalent to that needed for the execution of 100 instructions which hit in the caches. Then, if all data accesses hit, but just 1% of the instructions miss in the cache, the processor will execute programs at about half its capability (i.e., on average, each 100 instructions executed will have the first 99 instructions executed at peak rate, while the hundredth instruction will take another 100 instruction times).

There are some workloads, or programs, which have an unfortunate pattern of memory utilization such that their 'hit rate' (i.e., the percentage of memory accesses which can be satisfied from an economically-sized cache) is rather low. Because of the effects described before, this can sharply reduce the effective performance of the computer system, reducing it from its peak capability by a factor of 5–10 times.

An example of such a workload is that offered by commercial data-processing workloads typified by database/ transactional processing. A further example of such a workload is that offered by current and future multimedia applications, in which large amounts of data are manipulated. A final example is that offered by traditional numerically-intensive computational workloads, which also have very large amounts of data to be manipulated.

To improve the performance of the system under such circumstances, it would be necessary to have other work for the system to perform, and to have the system detect that a that a cache miss had occurred and cause it to perform the other work when this happens. A system organized as an SMP (Symmetrical Multi-Processor) is constructed to take advantage of such a situation. An SMN will generally have more pieces of work outstanding or in progress than there are available processors, and as each piece of work (or 'process') encounters some blocking event (e.g. such as needing data from a disk) the associated operating system arranges to suspend the execution of the blocked process in favor of another process which is not blocked. In this manner, the system can make use of its computational resources fairly efficiently in the presence of extremely long-latency operations like disk I/O.

A generalization of this scheme allows the operating system to be notified- when other blocking events occur, such as a load instruction missing in the cache. Provided that a processor can cease execution of the current process and reactivate an available process in less time than it takes the memory system to provide the requested data, this can also increase resource utilization. In computer systems which embody this approach, it is usual to provide some fast mechanism for swapping out the current 'state' of the processor (the values of all its registers, etc.) and swapping 'in' the suspended set. This may be done by providing the processor with multiple copies of the necessary resources, and selecting between them; or by providing the processor with access to some very fast private memory in which it can keep copies of the needed resources and swap between sets by performing high speed dump and restore operations. A processor with such a capability is often referred to as 'multi-threaded'. Even with a multithreaded processor, context switching can be quite expensive since there may be many registers to save and restore.

While these schemes can provide performance advantages, the process-swapping is always an unexpected event to the processor and is invisible to the software. Therefore, it is most desirable to avoid the overhead costs of process swapping.

Accordingly, it is the primary object of the present invention to provide an efficient method and mechanism for enhancing the overall performance of a processor through the ability to do useful work in parallel with long-latency main memory accesses.

It is a further object of the present invention to provide an efficient method and mechanism which can be easily incorporated or added to current microprocessor architectures.

SUMMARY OF THE INVENTION

The above objects are achieved in a preferred embodiment of the present invention which makes use of knowledge developed at the program writing stage by the programmer or by software tools such as a compiler that some substantial number of data accesses would miss in the cache hierarchy to the detriment of performance and that it would be possible to prefetch the necessary data in parallel with performing useful work. The invention provides a method and mechanism by which the program can specify such prefetching of data from main memory to a quickly-accessible data cache and by which the program can determine which such prefetches have completed. This mechanism makes it possible to improve the performance of the computer system through the effective use of added concurrency while avoiding the overhead of process-swapping.

The preferred embodiment includes a processor having at least the lowest level of the cache hierarchy implemented on one silicon die or chip wherein the processor is a conventional microprocessor which is enhanced by the addition of the background memory move (BMW) mechanism. The BMM mechanism performs background memory move operations for copying sections of memory in parallel with normal processor operation. Additionally, the microprocessor further includes means for executing additional instructions which include instructions for initiating and responding to the background movements of memory by the BMM mechanism. The cache hierarchy further provides means for selectively choosing which levels of the hierarchy are to contain new values read from memory. In the preferred embodiment of the invention, this is accomplished through the use of a ReadImmediate command which is coded to indicate the level at which data read from memory is to be encached.

The additional instructions include instructions used to initialize the BMM, to initiate different types of background move operations and to request the BMM to indicate completed background moves. The BMM mechanism operates by requesting the memory system to provide the contents of memory at one location, by copying those values to another location, and by keeping track of the transactions sent to the memory but not yet completed and the transactions completed but not yet notified to the processor. Because the source locations are locations known by the software to be unlikely to have been cached, while the destination locations are re-usable buffers which are very likely to be cached, the software is able to access the destination locations much more rapidly than the source locations, providing an overall increase in performance as long as the system was able to do other work concurrently with the memory background move operation.

To perform these tasks, the BMM mechanism utilizes two tables, a tag table and a transaction table, each table containing a plurality of locations for storing entries used in handling the different memory transactions. Each tag table entry has three fields; a first field used for storing a transaction index value which specifies an entry in the transaction table, a second field for storing a destination address specifying an address in memory into which the value returned from the memory system is to be written and a third field for storing values returned from memory. Each tag table entry corresponds to a transaction of the memory system requested by the BMM which has not yet been completed.

Each transaction table entry has one field used for storing an execution address which specifies the point where execution is to resume when the BNM has completed a background move operation. Each transaction table entry corresponds to a transaction requested by the BMM of the memory system which has not yet been notified to the processor.

The BMM further includes a number of registers for storing bit vector values to represent availability of BMM resources. Each bit vector register is used for managing a different class of resource and is sufficient in length for accommodating all available resources of that class wherein the contents of each bit position represents the availability of a particular resource. A first bit vector register is used to represent the availability of the entries in the tag table, a second bit vector register is used to represent the availability of entries in the transaction table, a third bit vector register is used to represent which transactions have completed; and a fourth bit vector is used to represent which transactions have been completed by the memory system but not yet written to the data cache.

During operation, when software making use of the functionality of the BMM mechanism is being executed, the processor executes a sequence of instructions which have the effect of requesting the BMM to initiate a sequence of move (copy) operations, specifying for each request a source location, a destination location and an execution location. The processor then continues executing instructions to fulfill the functions specified by the software while the copy operations initiated by the BMM mechanism proceed concurrently. As the work done by these instructions is completed, the processor executes an instruction asking the BMM for the execution location of any completed copy operation. When this information is provided by the BMM mechanism, which is likely to be immediately, the processor then branches to that location and continues execution of instruction code from that point. Upon completion of the work specified by this instruction code, the processor will again execute an instruction asking the BMM for a further execution location from a completed copy operation. The interleaving of work, requests for execution locations associated with completed copies and requests for further copy operations continues until the software completes its task.

The above objects and advantages of the present invention will be better understood from the following description when taken in conjunction with the accompanying drawings.

BRIEF DESCRIPTION OF THE DRAWINGS

FIG. 4a illustrates diagrammatically, the different resources of the background move mechanism of the present invention.

FIGS. 5a-1, 5a-2, 5b-1, 5b-2, 5c-1, 5c-2, 5d-1 and 5d-2 are diagrams used to describe the different internal operations performed by the background move mechanism of the present invention.

FIGS. 6a, 6b, 6c-1 and 6c-2 are diagrams used in describing the overall operation of the present invention.

FIGS. 9a and 9b illustrate extensions to the mechanism of the present invention.

DESCRIPTION OF THE PREFERRED EMBODIMENT

Figure 1:
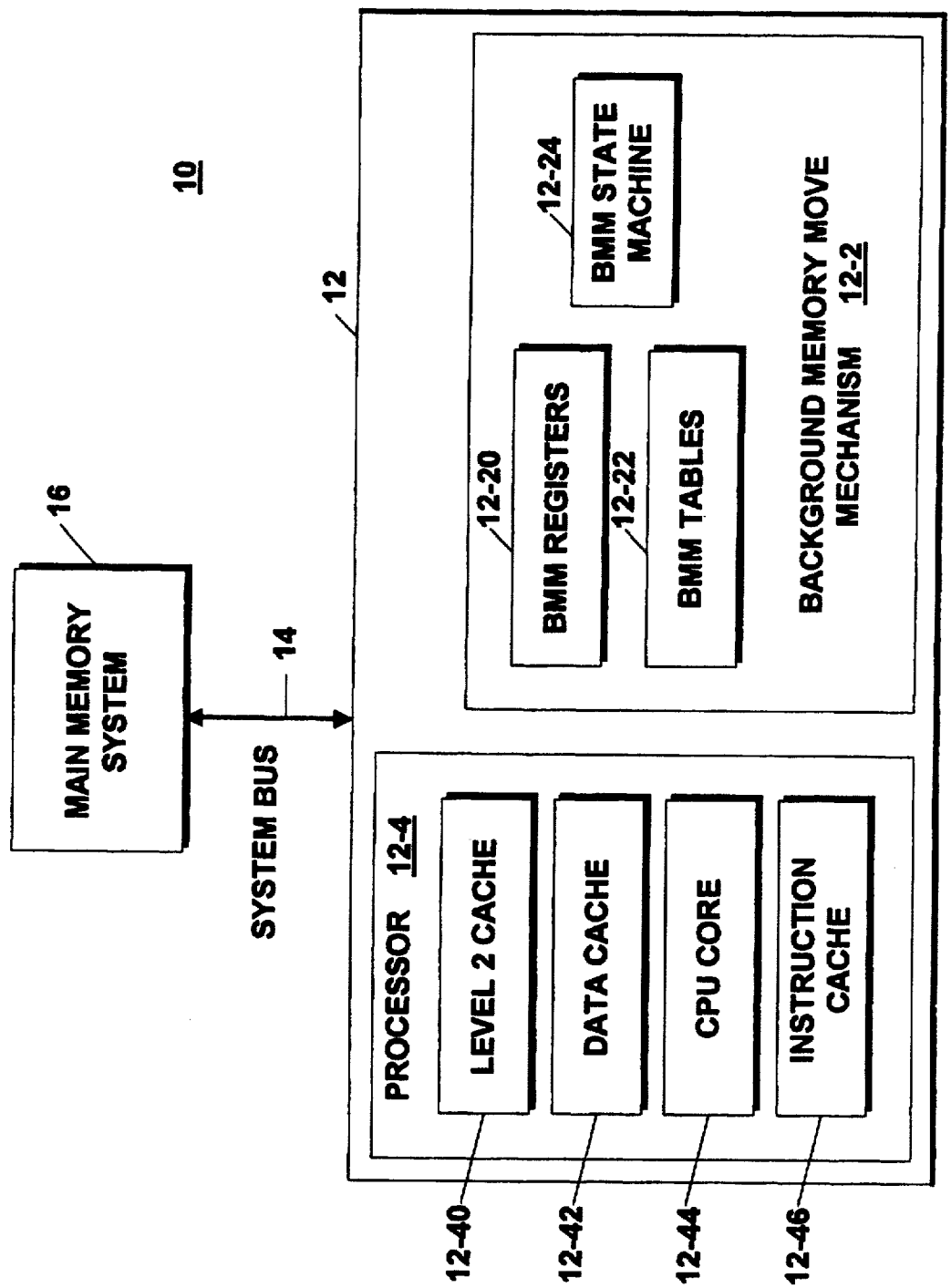
FIG. 1 illustrates in block diagram form, a computing system which incorporates the mechanism of the present invention.

FIG. 1 is a block diagram illustrating a data processing system 10 which incorporates the background memory move mechanism of the present invention. As shown, the system 10 includes a data processing unit 12 and a main memory system 16 which are coupled to communicate with each other over via a system bus 14 in a conventional manner. The data processing unit 12 includes a processor 12-4 and a background memory move (BMM) mechanism 12-2. For performance reasons, the processor 12-4 and BMM mechanism 12-2 are implemented on a single silicon die or chip. The processor 12-4 is a RISC based processor which comprises on-chip data and instruction caches 12-40 and 12-46 in addition to a CPU core section 12-44. The processor 12-4 may further include an on-chip level 2 cache. As indicated, the use of an onchip hierarchy is preferred because of performance reasons.

As shown, the BMM mechanism 12-2 includes two types of resources, a set of BMM registers 12-20 and a set of BMM tables 12-22. The BMM mechanism 12-2 further includes a state machine 12-24, conventional in design, which directs the mechanism 12-2 in processing transactions. As broadly indicated in FIG. 1, the BMM mechanism 12-2 has been added to a state of the art (conventional) computer system. To more clearly understand how this can be done, it is helpful to first review the architecture of such a system and its operation with reference to FIG. 2, before illustrating how a BMM mechanism may be added to that system and describing the detailed steps of operation of the BMM mechanism in such a system.

Figure 2:
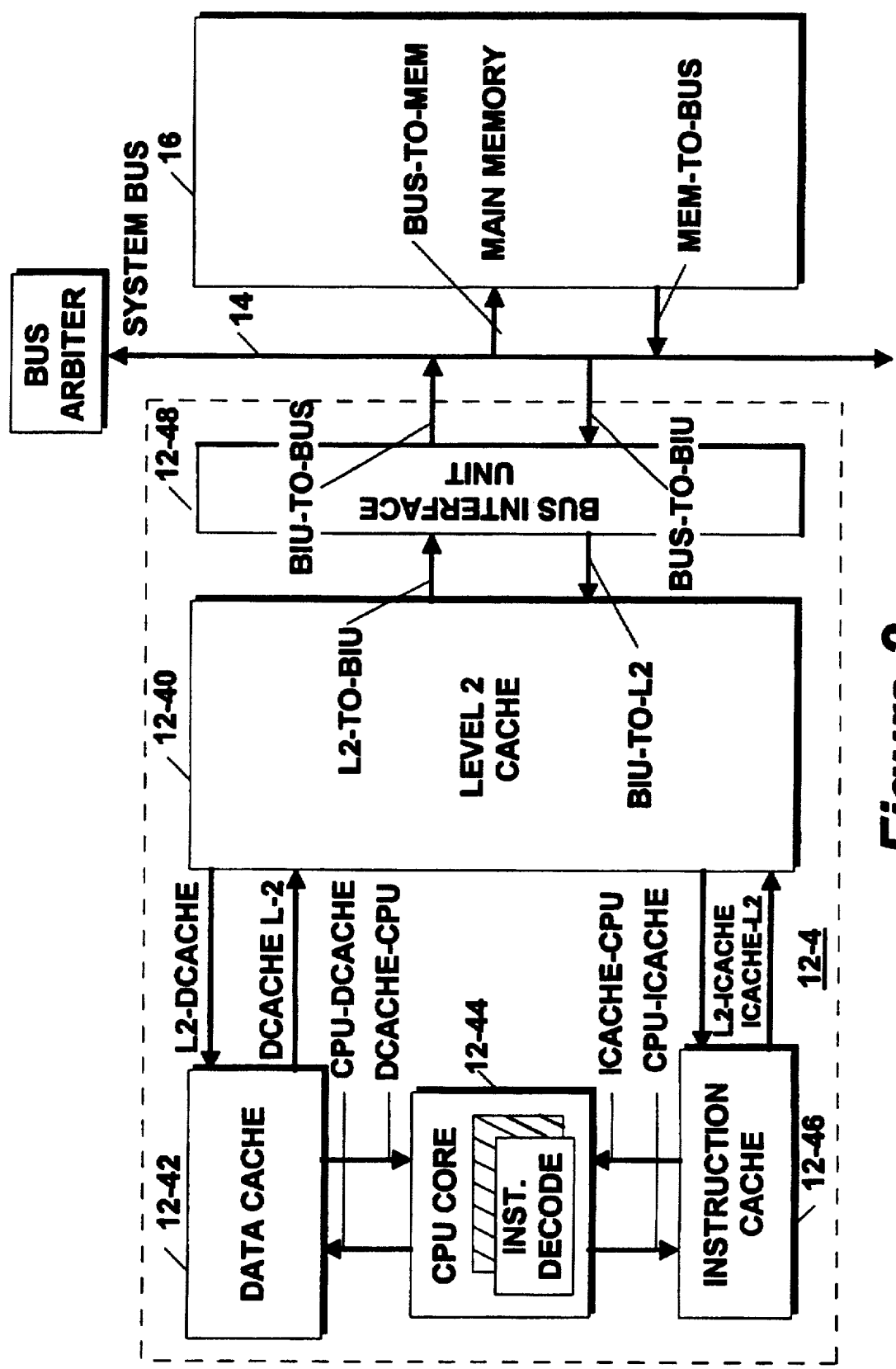
FIG. 2 illustrates in greater detail, a computing system which can be adapted to incorporate the apparatus of the present invention.

FIG. 2—Simple Conventional Computer System with a Cache Hierarchy

FIG. 2 shows in greater detail, the major subsystems of a state of the art computing system as comprising basic processor 12-44 labeled as CPU Core, its on-chip instruction cache 12-46 and data cache 12-42, a combined second level of cache 12-40 labeled as Level 2 cache, a bus interface unit 12-48, the system bus 14 and the main memory 16. The same reference numerals of FIG. 1 have been used relative to FIG. 2 and other figures for the purposes of indicating those subsystems or major components which can be implemented using state of the art elements. It will be understood that the description given herein has been simplified for the purposes of explanation and that more complex architectures and methods of operation are well known and practiced by those skilled in the art. Also, the use of the present invention in such more complex system implementations later discussed herein, should be clear to those skilled in the art.

In simple terms, the normal operation of the CPU core 12-44 may be described as follows. Every clock interval, the CPU core 12-44 asks the Cache 12-46 for an instruction, by presenting appropriate values including importantly, the address of the required next instruction on a signal path labeled CPU-Icache in FIG. 2. The instruction cache 12-46 looks inside itself to determine whether or not it contains the required instruction; if it does, it provides the instruction together with an indication of its availability to the CPU on a signal path labeled Icache-CPU in FIG. 2.

If, on the other hand, the instruction cache 12-44 does not contain the instruction, it indicates the lack of availability to the CPU by providing different information on that signal path and places a request to the level two (L2) cache 12-40 by providing appropriate information on a signal path labeled Icache-L2 in FIG. 2. On the successive or next clock interval, the L2 cache 12-40 performs its own internal lookup which may require several clock intervals. If the L2 cache 12-40 finds that it contains the instruction, it will provide the cache line containing that instruction to the instruction cache 12-46 by placing appropriate values on a signal path labeled L2-Icache in FIG. 2. In this case, the instruction cache 12-46 on the successive clock interval, will update its internal data with the provided instructions and then provide the processor 12-44 with the required instruction in a normal manner using the signal path labeled Icache-CPU in FIG. 2.

If the L2 cache 12-40 does not contain the requested instruction, it must request it from main memory 16. It does this by first sending a request for the instruction and some number of surrounding instructions to the bus interface unit 12-48 by placing appropriate values on a signal path labeled L2-to-BIU in FIG. 2. On the successive clock interval, the Bus Interface Unit 12-48 accepts this request and then attempts to obtain use of the system bus 16, by requesting the bus from a Bus Arbiter 14-2 by placing appropriate values on a signal path labeled BIU-to-Bus in FIG. 2. The Bus Arbiter 14-2 at some point will grant access to the bus and will indicate this to the Bus Interface Unit 12-48 by placing appropriate values on the signal path labeled Bus-to-BIU in FIG. 2.

At this juncture, the Bus Interface Unit 12-48 places a request to the memory system 16 onto the system bus 14 by writing appropriate values into the signal path marked BIU-to-Bus in FIG. 2. Since the Memory System 16 like other bus agents is required to "watch" the bus when other units are using it, will see the request on the bus 14 and copy it into memory through a signal path labeled Bus-to-Mem in FIG. 2. The memory system 16 will then access the specified group of addresses which may require many clock intervals. When the memory system 16 has read the required group of addresses, it will ask for the bus 14 and be granted such access in the same manner as that employed by the Bus Interface Unit 12-48 but by using signal paths labeled Mem-to-Bus and Bus-to-Mem in FIG. 2. When granted access to the bus, the memory system 16 will provide the block of instructions via the signal paths labeled Mem-to-Bus in FIG. 2.

In a manner similar to the progress of the request from instruction cache 12-46 to Bus Interface Unit 12-48 to Memory 16, the instructions will be propagated back through the Bus Interface Unit 12-48, the Level 2 Cache 12-40 (which may make a copy as it passes the instructions on) and to the instruction cache 12-46 which after making a copy provides the appropriate instruction to processor 12-44. Once having received the instruction, processor 12-44 will perform the specified operations.

It will be understood that processors vary widely in their instruction set repertoire both in representation and meaning. While it will be understood that the BMM mechanism 12-22 may be added to any normal processor design regardless of its instruction set design, it is most desirable to choose a particular instruction set for simplicity of explanation. For clarity and ease of explanation, the processor 12-44 will be described as a simple RISC-style machine with 32 general-purpose registers, and two instruction types.

One instruction type specifies two source operands and one destination register together with an operation (such as 'add' or 'multiply'). As an example, the effect of an add r1, r2, r3 instruction is to take the values held in the specified source operands (that is, in registers r2 and r3), to add the values together, and to write the resulting value into the specified destination register, that is, register r1. The operands are either two registers or one register and one literal or constant value specified in the instruction. In addition to arithmetic operations such as 'add', memory-access instructions 'load' and 'store' are also specified. These instructions add their source operands to provide an address in memory. A load instruction reads the 32-bit value from that address in memory and writes it into the specified destination while a 'store' instruction takes the 32 bit value from the specified destination register and writes it to the specified memory address.

The second instruction type also specifies two source operands and a destination operand, together with an operation code portion specifying that under certain circumstances, the next instruction to be executed should not be the following instruction but one specified by the destination operand. The source operands can be two registers, or a single register and the value zero while the destination may be the contents of a register, or a literal or constant in the instruction.

When the instruction executed is one which is not a load or a store, the processor 12-44 performs the appropriate operations internally to itself, and then requests the next instruction for execution. When the instruction specifies a load operation, the processor 12-44 requests the data from the data cache 12-42 by providing on the signal path labeled CPU-Dcache in FIG. 2, appropriate information including the requested address and the command read. The data cache 12-42 will then either provide the requested value (if it contains it) or will forward the request in manner similar to those operations performed by the instruction cache 12-46 when it did not contain the requested instruction. Eventually, the requested data will be found and propagated back to the data cache 12-42, which will update itself and then provide the value to the processor 12-44. When the instruction is a store, a similar sequence of actions occurs.

There are a number of well-understood schemes to improve processor efficiency beyond that discussed herein. For example, the processor 12-44 may mark the destination register of a load instruction with a special bit indicating that the contents are not valid (clearing the bit when the value is delivered by the cache hierarchy), and then continue to immediately fetch the next instruction for execution. The processor 12-44 may continue to execute instructions while the data fetch is occurring as long as the registers involved in each instruction are marked valid. If any register is invalid, the processor must stall (cease execution of this and subsequent instructions) until the memory hierarchy delivers the value.

Figure 3A:
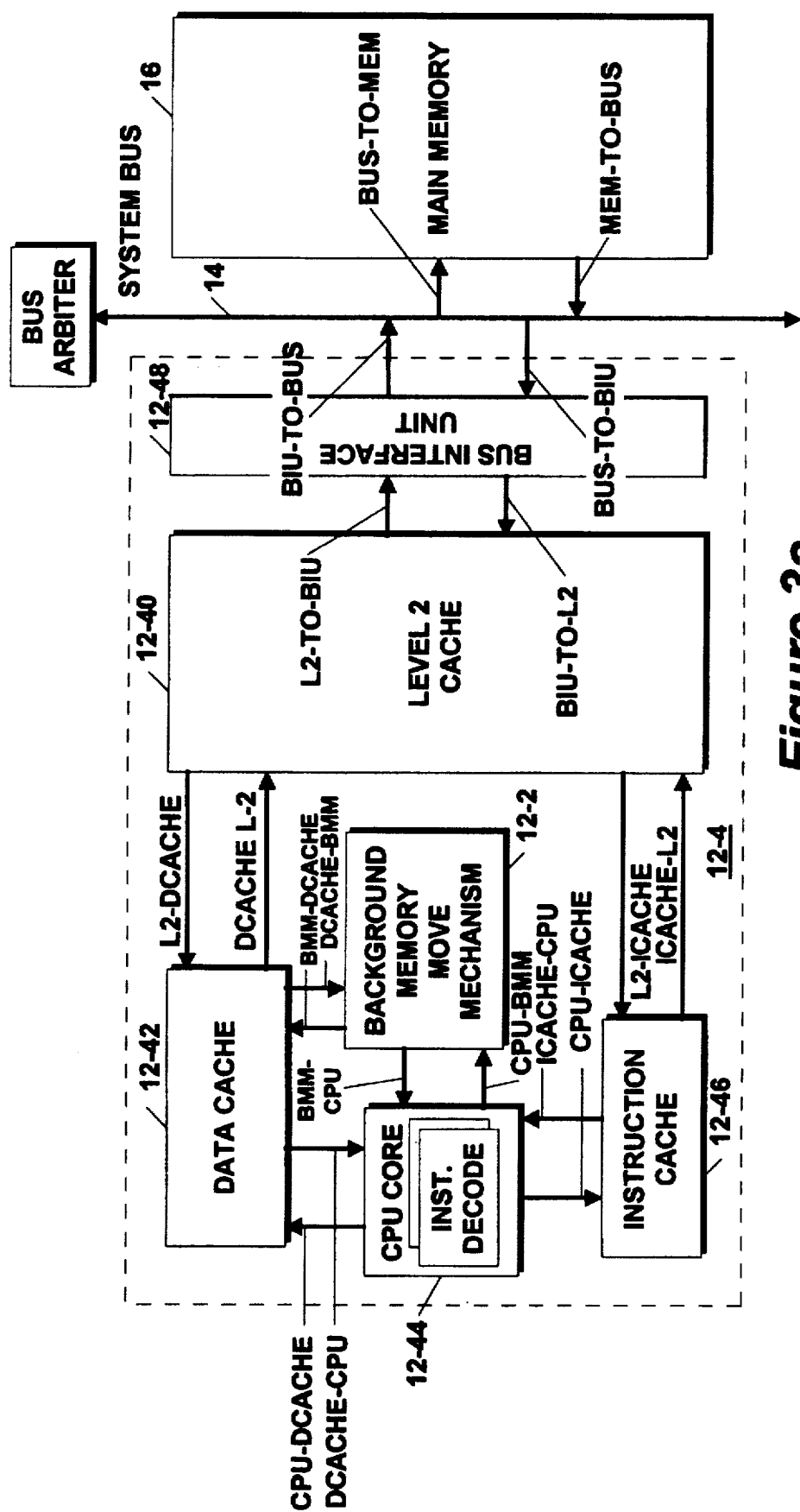
FIG. 3a illustrates in block diagram form, a computing system to which the mechanism of the present invention has been added.

FIG. 3a—Adding the BMM Mechanism to a Simple Conventional Computer System with a Cache Hierarchy FIG. 3a shows the computing system of FIG. 2 with the addition of the Background Memory Move (BMM mechanism 12-2 according to the teachings of the present invention. As indicated, BMM 12-2 includes interfaces to the processor 12-44 (i.e., the signal paths marked BMM-CPU and CPU-BMM), and interfaces to the data cache 12-42 (i.e., the signal paths marked BMM-Dcache and Dcache-BMM). In addition, the normal 'read' command used by the processor to request data from its caches is augmented by a further command, 'ReadImmediate', whose operation is described below but whose function is to allow any read which must be satisfied by the main memory to be propagated back from the memory system 16 and BIU 12-48 to the BMM 12-2, without updating the contents of the Dcache 12-42 and the L2 cache 12-40.

The BMM 12-2 includes (i.e., executes) a small command repertoire. The repertoire includes the commands initBlockMove, initBMM, tellExec, tellCount, tellCountO. These commands are used (i.e., issued) by the processor to request activity by the BMM 12-2. The BMM 12-2 also has a small command repertoire which is used in asking the Dcache 12-42 to perform activities. This repertoire includes the commands ReadImmediate and WriteLine which are commands utilized by the system of the present invention. The commands are formatted in a standard manner. Additionally, the ReadImmediate command according to the present invention is formatted to include control information specifying the levels within the cache hierarchy that the returned memory values are to be encached. The use of these commands are further discussed herein.

The BMM 12-2 interfaces to the processor 12-44 and to the Data cache 12-42 include a number of sets of interface registers. On any clock interval, the BMM 12-2 may be requested by the processor 12-44 to perform some operation, may be passing values back to the processor, or may be requesting the data cache to perform an operation. The BMM 12-2 uses a separate set of the interface registers for each such communication. In greater detail, each interface register set has a busy indicator, a command register and some data registers. When any agent needs to communicate with another, it does so by first checking that the appropriate interface is not busy. If the interface is busy, the agent must attempt the operation again on a successive clock cycle. If the interface is not busy, the agent writes the appropriate command and data values into the interface registers and sets the indicator to busy.

Thus, during any clock interval, BMM 12-2 may receive a request from the processor 12-44 or it may discover that it has work to perform from earlier clock cycles. This work from prior cycles arises as follows. In response to certain processor requests, the BMM 12-2 will allocate internal private buffer space for a transaction and then will request the data cache 12-42 through the interface described herein to provide a set of memory values, employing a ReadImmediate command which is coded to specify that no level of the cache hierarchy is to store the resulting value. Because the buffer space is allocated for the sole use of the transaction, it is not necessary to arbitrate for access to it. When the memory system eventually provides the values in the normal manner, delivering it to the data cache 12-42, the data cache 12-42 passes the value through to the BMM 12-2, writing it directly into the appropriate allocated private buffer identified from the transaction's tag and signaling the arrival by updating the appropriate bit in the returned transactions bit vector. It is the presence of such bits in the returned transactions bit vector which indicates that the BMM 12-2 has internal work to perform.

Figure 4B:
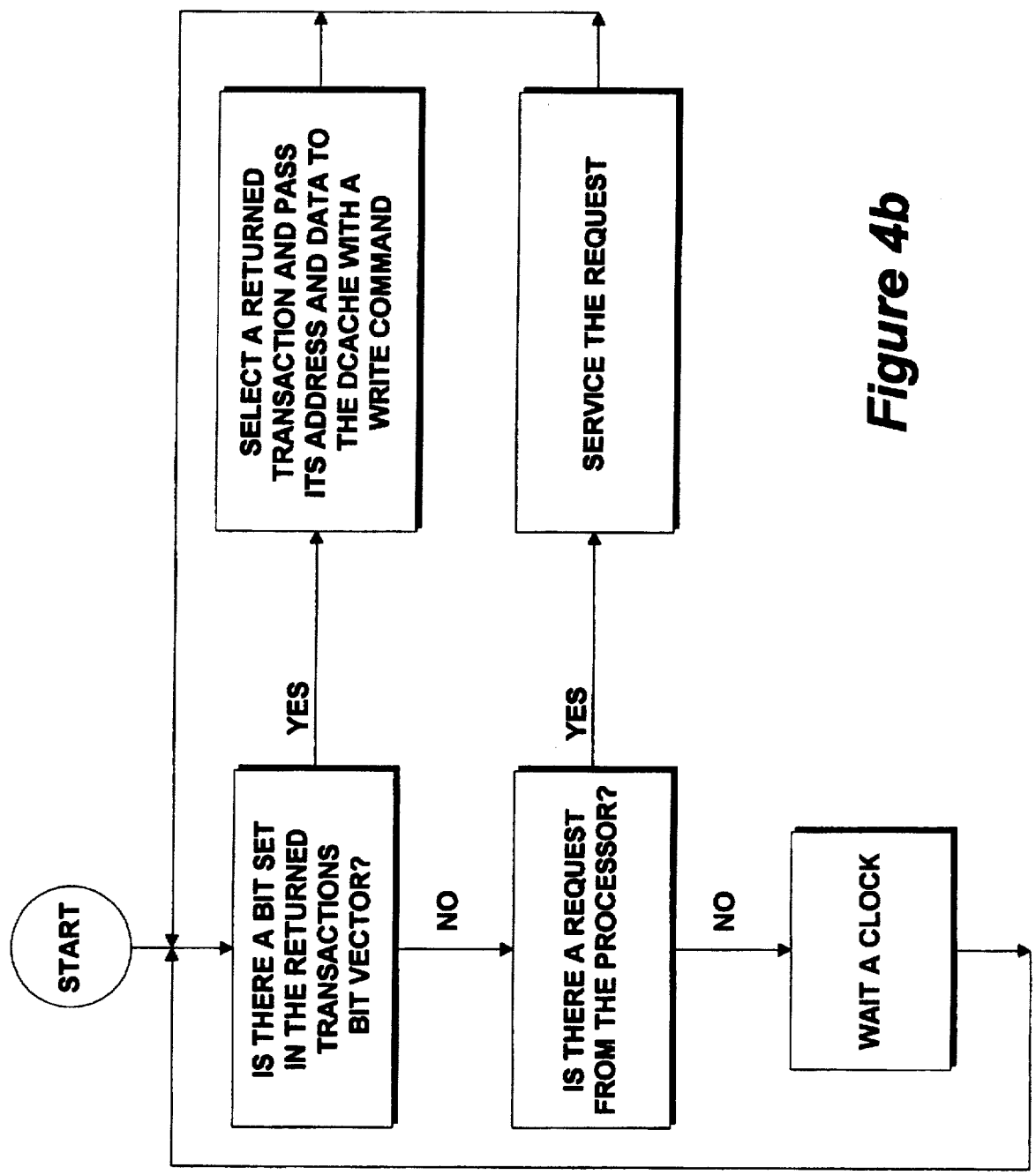
FIG. 4b illustrates diagrammatically, the operation of the background move mechanism state machine.

Therefore, on any clock, BMM 12-2 must choose between performing such internal work and servicing a possible request from the processor 12-44. To determine the order in which these should be serviced, the BMM 12-2 uses a priority-based approach. More specifically, it first looks to see if there has work which needs completing. If there is such work, BMM 12-2 will complete that work; this work will be the delivery of values held in the private line buffers marked with their appropriate destination addresses to the data cache 12-42 so that the values are properly cached therein. If there is no work, BMM 12-2 will see if there is a request from the processor 12-44 and if so, it will service that request. To service a request from the processor 12-2, the BMM 12-2 performs the following simple sequence of operations. It copies values from the interface registers to its internal registers, effects or executes the command and when completed it clears the state of the busy indicator included in that interface. The above described sequencing is illustrated in FIG. 4b.

Added Processor Instructions

The processor's base instruction set is augmented by a small number of instructions described below which allow it to work with the BMM 12-2. The functionality of the cache hierarchy is also enhanced by adding the capability to understand and act on the 'ReadImmediate' command as well as the normal 'read' command. This type of capability is found in standard cache memory implementations. That is, the ReadImmediate command issued by the BMM 12-2 is coded to include information specifying to the memory system, how the returned data values is to be processed causing each level of the cache hierarchy to encache returned data values according to such coded information.

When the processor is executing instructions which form part of its original instruction set, it behaves exactly as described above. When it executes instructions whichallow it to work with the BMM 12-2, the operation is as described herein. For convenience, these instructions are also summarized in the Appendix.

The following instructions are added to the processor's base instruction set according to the present invention.

The first instruction is a background block move (bmb) instruction having the form bmb rd, rs1, rs2. This instruction is used to initiate a background copy of a block of memory. The register specified by the rd field contains the address at which execution is to continue upon completion of this copy operation. The register rs1 field contains the source address associated with this transaction and the register specified by the rs2 field contains the destination address.

When the processor executes the bmb instruction, it passes to the BMM 12-2, the values from the registers specified by the rd, rs1 and rs2 fields together with a BMM command initBlockMove. Upon receiving the in it command, the BMM 12-2 tries to allocate a free tag table entry and a free transaction table entry. If it succeeds, it "connects" the selected table entries and initializes their fields appropriately from the values given to it by the processor 12-44. The BMM 12-2 then issues a read immediate command to the memory system 16 through its interface to the main memory system 16 (i.e., Dcache 12-42).

The ReadImmediate command has as a tag, the index of the selected tag table entry and specifies the source address provided by the bmb instruction. The BMM 12-2 then provides back to the processor 12-44, the index of the selected tag table entry, or the value "−1" if the allocation could not be done. The processor 12-44 writes the returned value into the register specified by the rd field.

The second instruction is an initialize background move machine instruction having the form initb rd, rs1, rs2. This instruction is used to initialize the BMM 12-2 prior to use. The processor 12-44 in response to executing the instruction passes a command initBMM to the BMM 12-2. The BMM 12-2 in response to such command, then initializes itself and the contents of its tables and passes back to the processor 12-44, a value which specifies the number of bytes transferred by a bmb instruction. The processor writes this value into the register specified by the rd field.

The third instruction is a next completed transaction instruction having the form tellb rd, rs1, rs2. This instruction is used by processor 12-44 to discover a location at which instruction execution should continue. The processor 12-44 in response to this instruction, provides a command tellExec to the BMM 12-2 causing it to find the first completed transaction, extract the execution address from the transaction table, free the transaction table entry, and pass the address back to the processor 12-44. If there were no transactions completed, the BMM 12-2 provides the address zero. The processor 12-44 then writes the execution address into the register specified by the rd field.

The fourth instruction is a number of completed transactions instruction having the form countbd rd, rs1, rs2. This instruction is used by processor 12-44 to discover how many requested transactions have completed but have not been serviced by the processor 12-44. The processor 12-44 in response to this instruction, provides a command tellCount to the BMM 12-2 causing it to count the number of completed but unserviced transactions and provide the count value to the processor 12-44. The processor 12-44 then writes the count into the register specified by the rd field.

The fifth instruction is a number outstanding transactions instruction having the form countbo rd, rs1, rs2. This instruction is used by processor 12-44 to discover how many transactions have been requested but have not been serviced by processor 12-44 or which have not yet completed. In response to this instruction, processor 12-44 issues a command tellCountO to the BMM 12-2 causing it to count the number of transactions and provide the count value back to the processor 12-44. The processor 12-44 then writes the count value into the processor register specified by the rd field.

Figure 3B:
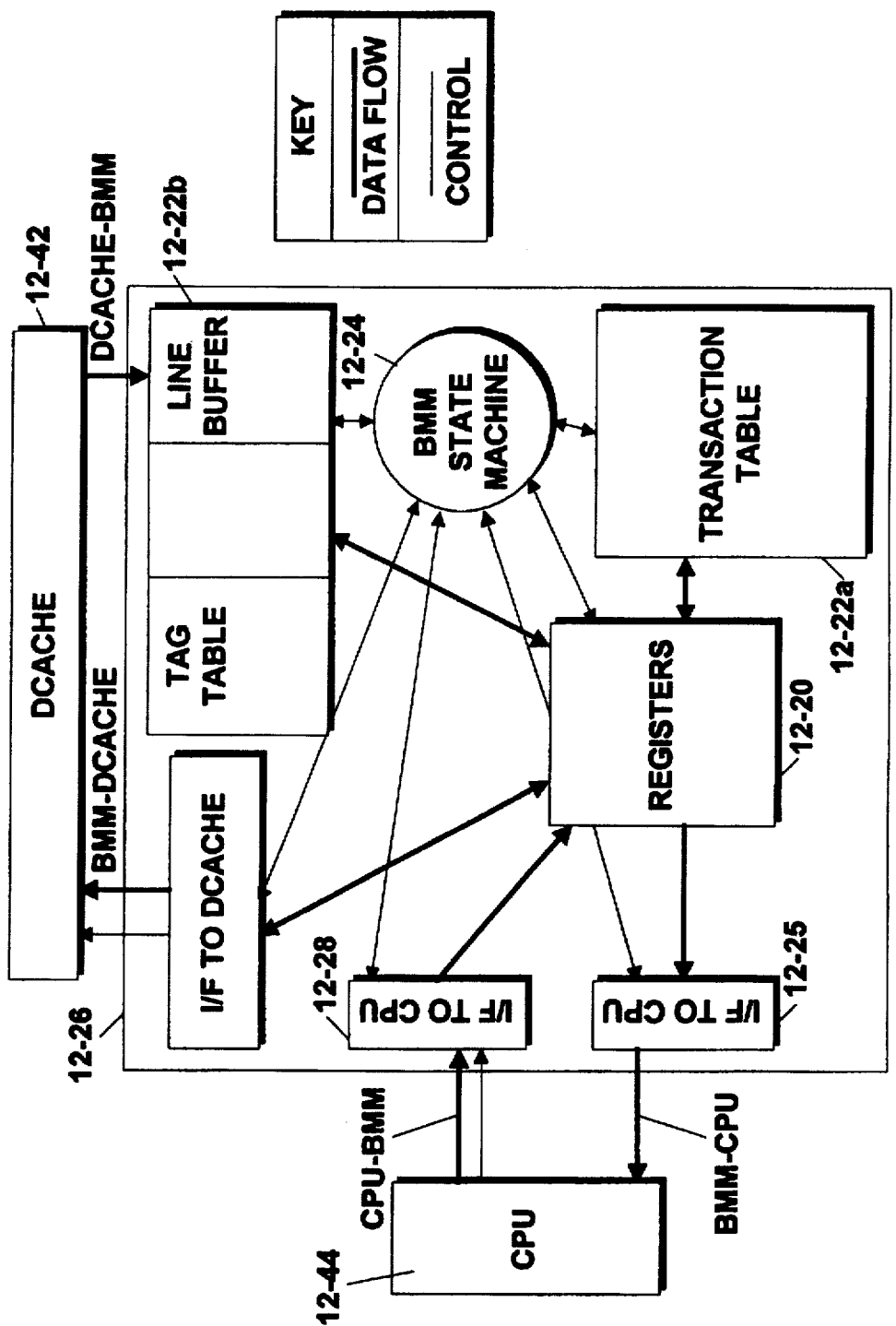
FIG. 3b illustrates in greater detail, the background move mechanism of the present invention.

FIG. 3b BMM Organization and Resources

FIG. 3b illustrates in greater detail, the components which comprise the BMM mechanism 12-2 of the present invention. As shown, BMM 12-2 includes a tag table 12-22b, a transactions table 12-22a, a plurality of registers 12-20, a set of D cache interface registers 12-26, a set of processor interface registers 12-25 and 12-28 and BMM state machine component 12-24 arranged as indicated. As discussed above, the BMM state machine 12-24 is the component of the BMM 12-2 that decides what needs to be done during each clock cycle and sequences BMM 12-2 through the required operations as discussed herein.

FIG. 4a—Tables and Resources

FIG. 4a illustrates the tables and register resources in greater detail. As indicated, the resources include the tag table 12-22b which is organized to contain one entry for each request to memory. Each entry is formatted to include the following; a transaction index field which stores index of associated transaction table entry, a destination address field which stores address to which data is to be written and a line buffer field which holds the cacheline's worth of data returned by the memory system. Associated with the tag table 12-22b is a BMM tags bit vector register which stores a tags bit vector containing one bit per entry in the tag table which is cleared (i.e., set to a binary ZERO state) if its associated entry is free (i.e., available for use).

Another resource is transactions table 12-22a which is organized to contain one entry for each group of requests to the BMM 12-2. Each entry is formatted to include an execution address field which stores the address of code to execute upon completion. Associated therewith are three registers of the BMM registers 12-20 for storing respectively, a free transactions bit vector containing one bit per entry in the transactions table which is cleared if free, a completed transactions bit vector containing one bit per entry in the transactions table which is set if completed, and a returned transactions bit vector containing one bit per entry in the tag table which is set if transaction has returned data to the BMM 12-2 but such data has not been written to Dcache 12-42.

As indicated in FIG. 4a, the other registers of the BMM registers 12-20 include a BMM tag register used to hold the index of a tag table entry, and a transaction register used to hold the index of a transaction table entry.

A further resource is BMM-Dcache Interface registers of interface 12-26 which as shown in FIG. 4a include command, tag and address registers for holding values to be passed to the Dcache 12-42. The registers of interface 12-26 further include a BMM-Dcache busy indicator which if set to a binary ONE state, indicates the interface 12-26 is busy.

Also, the resources include the CPU-BMM Interface registers of interface 12-28 which include command, rA, rB and rC registers to hold values communicated to the BMM 12-2 by CPU 12-44 and values to be provided to the CPU 12-44 by the BAM 12-2. The rA, rB and rC registers are also used as general-purpose registers by the BMM 12-2. The registers 12-28 further include a CPU-BMM busy indicator register which if set to a binary ONE state, indicates the interface 12-28 is busy.

Additionally, as indicated in FIG. 4a, the resources include the BMM-CPU Interface registers of interface 12-25 which include a rD register used to pass values back to processor 12-44 and a BMM-CPU busy indicator register which if set to a binary ONE state, indicates this interface 12-25 is busy.

Processor-BMM Communications

The above described resources of FIG. 4a are used by the BMM 12-2 to communicate with processor 12-44 and Dcache 12-40. That is, the processor 12-44 and BMM 12-2 communicate commands and data through the processor interface registers of the BMM 12-2. The following sequence of operations is used whenever the processor "tells" the BMM 12-2 to perform some action.

1. Processor-BMM Communication

As indicated above, processor 12-44 and BMM 12-2 communicate via data/command paths labeled as CPU-BMM and BMM-CPU in FIG. 3a. These paths allow the processor to read from and write to the BMM's processor registers of interface 12-28.

The processor looks at the state of the CPU-BMM busy indicator register. If the interface 12-28 is free or available, the processor 12-44 sets the busy indicator to a binary ONE state and writes the required command into the command register and values appropriate to the command into the registers rA, rB and rC. If the busy indicator register has been set to a binary ONE indicating that the interface 12-28 is busy (i.e., BMM 12-2 is not yet free to accept a new command), the processor 12-44 must wait a clock interval before repeating the attempted operation again during a successive clock interval. When the BMM 12-2 has completed the requested operation, it will clear the busy bit indicator register of interface 12-28 to ZERO.

2. BMM-Processor Communication

When the operation requested of the BMM 12-2 involves passing information back to the processor 12-44, the BMM 12-2 will attempt to write into the BMM-CPU interface register rD of interface 12-25. To do this, it first looks at state of the BMM-CPU busy indicator register. If the interface 12-25 is free, BMM 12-2 sets the busy indicator register and writes the requested value into the interface registers. If it is not free, BMM 12-2 waits one clock interval before attempting the operation again. The processor 12-44 is able to determine the availability of the new value because the busy indicator register will have been set. On removing the value, the processor 12-44 clears the busy indicator register.

It will be understood that the same type of protocols used in the interchanges taking place between processor 12-44 and BMM 12-2 are also used in other BMM interchanges as seen in the descriptions below. These other interchanges will now be discussed in greater detail.

BMM-Dcache Communications

As indicated, the BMM 12-2 and the data cache 12-42 of FIG. 3a communicate in a manner similar to the processor-BMM communications (i.e., use the same type of protocols). The Dcache 12-42 and BMM 12-2 communicate via data/command paths labeled as Dcache-BMM and BMM-Dcache in FIG. 3a. The BMM 12-2 requests the Dcache 12-42 to perform some operation by writing values into the BMM-Dcache interface registers of interface 12-26 illustrated FIG. 4a and then setting the interface's busy indicator register to a binary ONE state. The following sequence of operations is used whenever the BMM 12-2 "tells" the Dcache 12-42 to perform some action.

1. BMM-Dcache Communication

The Dcache and BMM 12-2 communicate via data/command paths labeled as Dcache-BMM and BMM-Dcache in FIG. 3a. To pass a command to the Dcache 12-42, the BMM 12-2 uses the BMM-Dcache interface registers of interface 12-26. If the interface's busy indicator register is not set to a binary ONE state, the BMM 12-2 writes the required command into the interface command register; along with writing appropriate values into the tag and address registers of the BMM Dcache interface 12-26. The BMM 12-2 also sets the interface's busy indicator register to a binary ONE state. If the interface busy indicator register is already set indicating that the Dcache 12-42 has not completed a prior command, the BMM 12-2 must wait a clock interval before repeating the attempted operation on a successive clock interval.

2. Dcache-BMM Communication

When the memory system 16 passes a value from memory back to the BMM 12-2, it is delivered via the Dcache 12-42 to BMM 12-2 without being stored by the Dcache 12-42 as described herein. Each memory transaction is identified by a tag and the Dcache 12-42 uses the tag of the returning value to select an entry in the tag table 12-22b. The Dcache 12-42 then writes the returning value into the line buffer field of that tag table entry and sets the corresponding bit in the returned transactions bit vector register of the BMM registers 12-20. Because the line buffer field to be written is allocated for the use of the specific transaction, there is no need for the Dcache 12-42 to arbitrate for access to the line buffer. The write may be done in any clock cycle in parallel with other operations.

FIGS. 5a-1 through 5e-2-BMM Internal Operations

Figures 2, 5A:
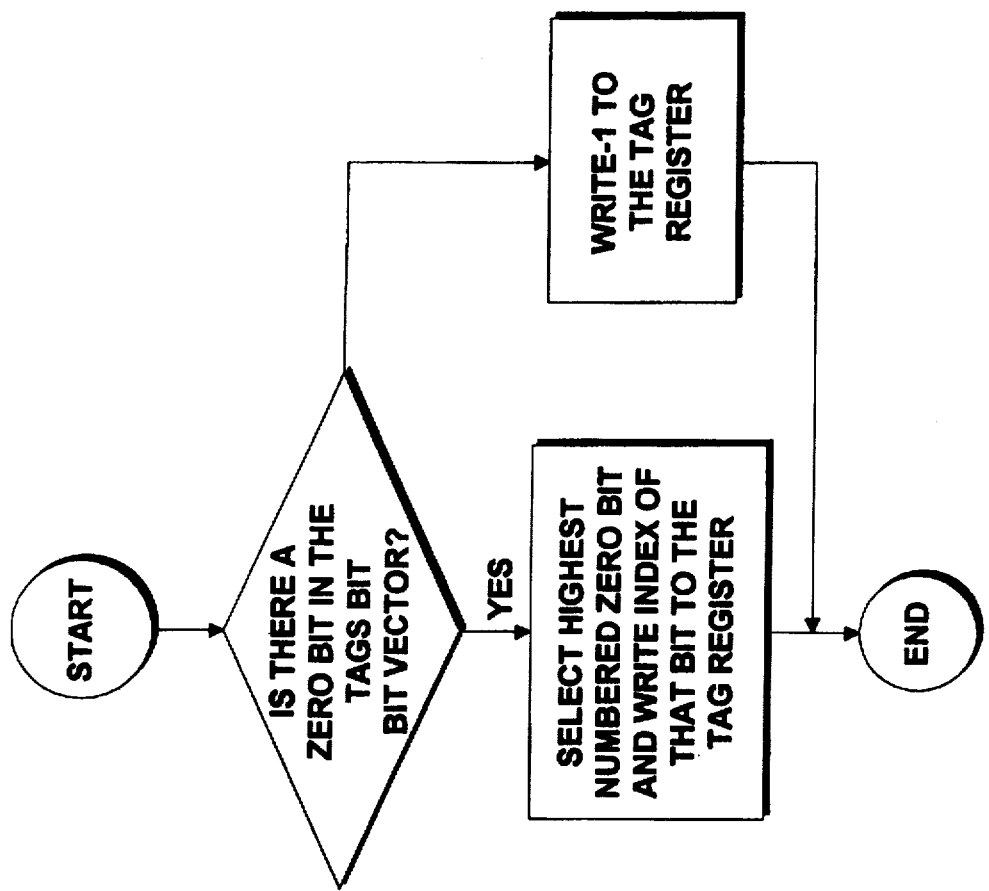
Figures 1, 5A:
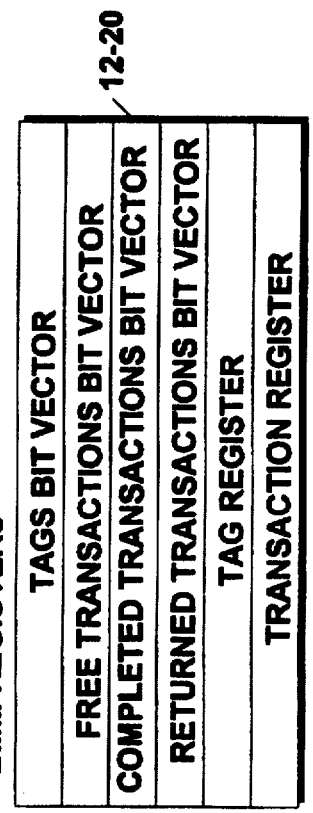

The BMM 12-2 performs a number of standard internal operations in conjunction with executing commands received from processor 12-44. FIGS. 5a-1 through 5d illustrate in greater detail, the internal operations performed by the BMM 12-2 according to the present invention. These internal operations will now be described.

Allocating a tag

FIGS. 5a-1 and 5a-2 illustrate the operations performed by the BMM 12-2 in allocating a tag table entry. As indicated in FIG. 5a-2, BMM 12-2 searches the tags bit vector register of FIG. 5a-1 once. If it has a clear bit, it notes that bit in the tag register and sets it to a binary ONE. The highest-numbered bit is chosen if more than one bit is zero and the bit index is written into the tag register. If there is no free bit, the value of −1 is written into the tag register.

Allocating a transaction

Figures 2, 5B:
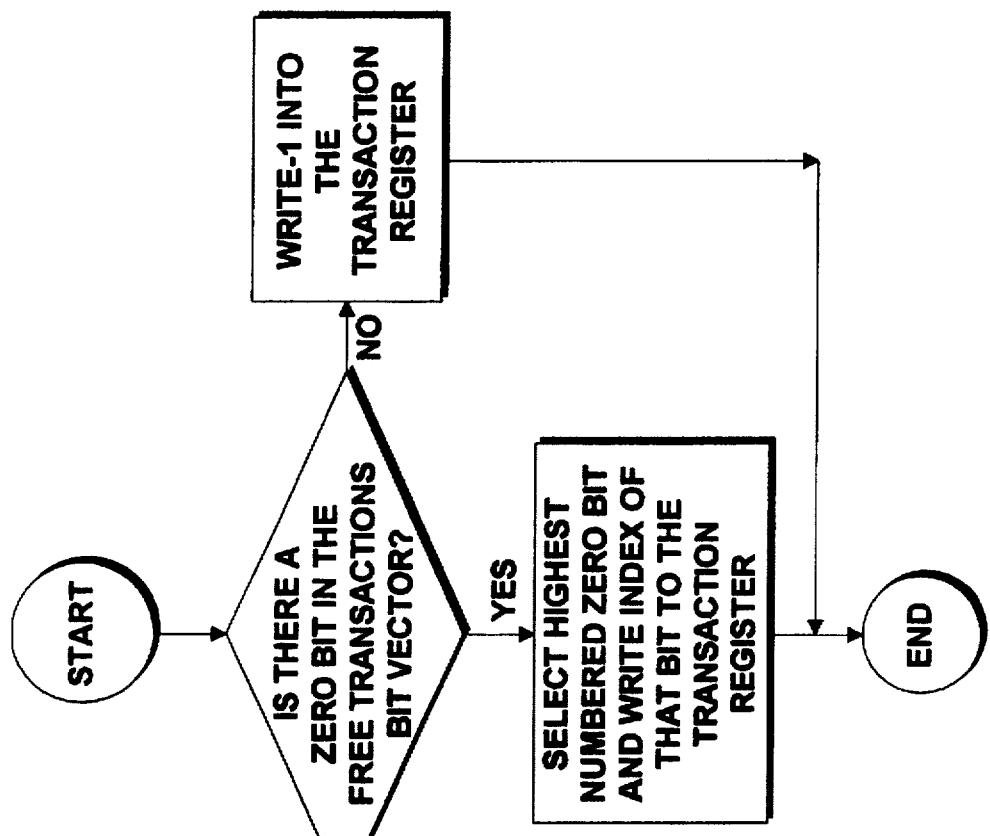
Figures 1, 5B:
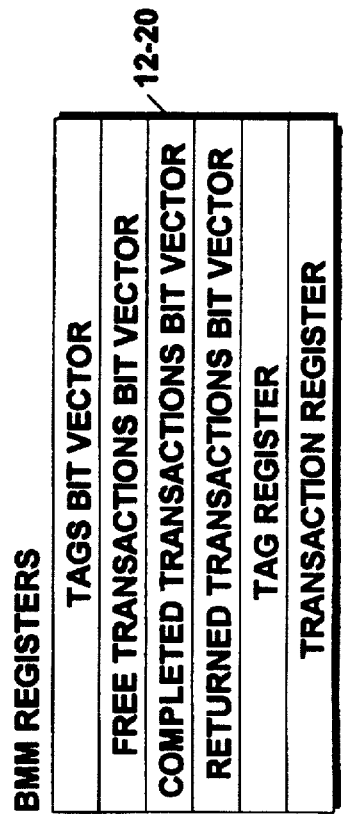
Figures 1, 2, 5D:
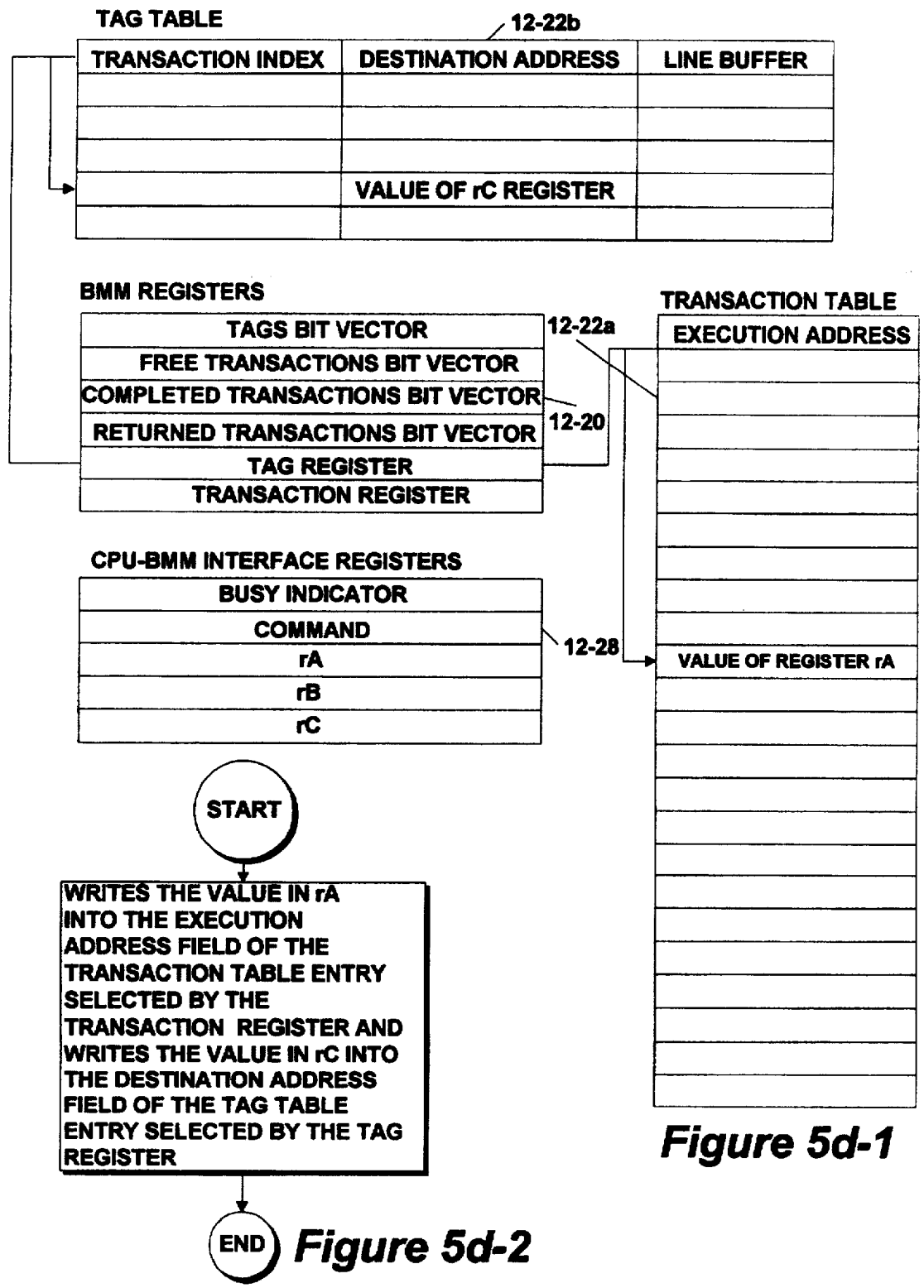

FIGS. 5b-1 and 5b-2 illustrate the operations performed by BMM 12-2 in allocating a transaction table entry. As indicated in FIG. 5b-2, BMM 12-2 searches the free transactions bit vector register of FIG. 5b-1 once. If it has a clear bit, BMM 12-2 notes that bit in the transactions register and sets the bit to a binary ONE state. The highest-numbered bit is chosen if more than one bit is zero and the bit index is written into the transaction register. If there is no free bit, BMM 12-2 writes the value −1 into the transaction register.

Connecting the tag table entry to the transaction

FIGS. 5c-1 and 5c-2 illustrate the operations performed by BMM 12-2 in connecting a tag table entry to a transaction table entry. As indicated in FIG. 5c-2, the BMM 12-2 writes the value of the transactions register of FIG. 5c-1 into the transaction index field of the tag table entry of tag table 12-22b specified by the value contained in the tag register.

Initializing a transaction

FIGS. 5d-1 and 5d-2 illustrate the operations performed by BMM 12-2 in initializing a transaction. As shown in FIG. 5d-2, the BMM 12-2 writes the value in the rA register of FIG. 5d-1 into the execution address field of the transaction table entry of transaction table 12-22a selected by the contents of the transaction register and writes the value in the rB register into the destination address field of the tag table entry of tag table 12-22b specified by contents of the tag register.

DESCRIPTION OF OPERATION

With reference to FIGS. 1 through 6c and the flow chart of FIG. 10, the operation of the preferred embodiment of the present invention will now be described relative to performing a background move operation. First, as indicated in block 100 of FIG. 10, processor 12-44 initializes the BMM 12-2 by executing an initialize background move machine (initb) instruction. In greater detail, processor 12-44 initializes the BMM 12-2 by executing an initb instruction having the format initb rd, rs1, rs2. The processor 12-44 ignores the rs1 and rs2 fields and passes the initBMM command to the BMM 12-2 via the signal path labeled CPU-BMM in FIG. 3a.

Figure 6A:
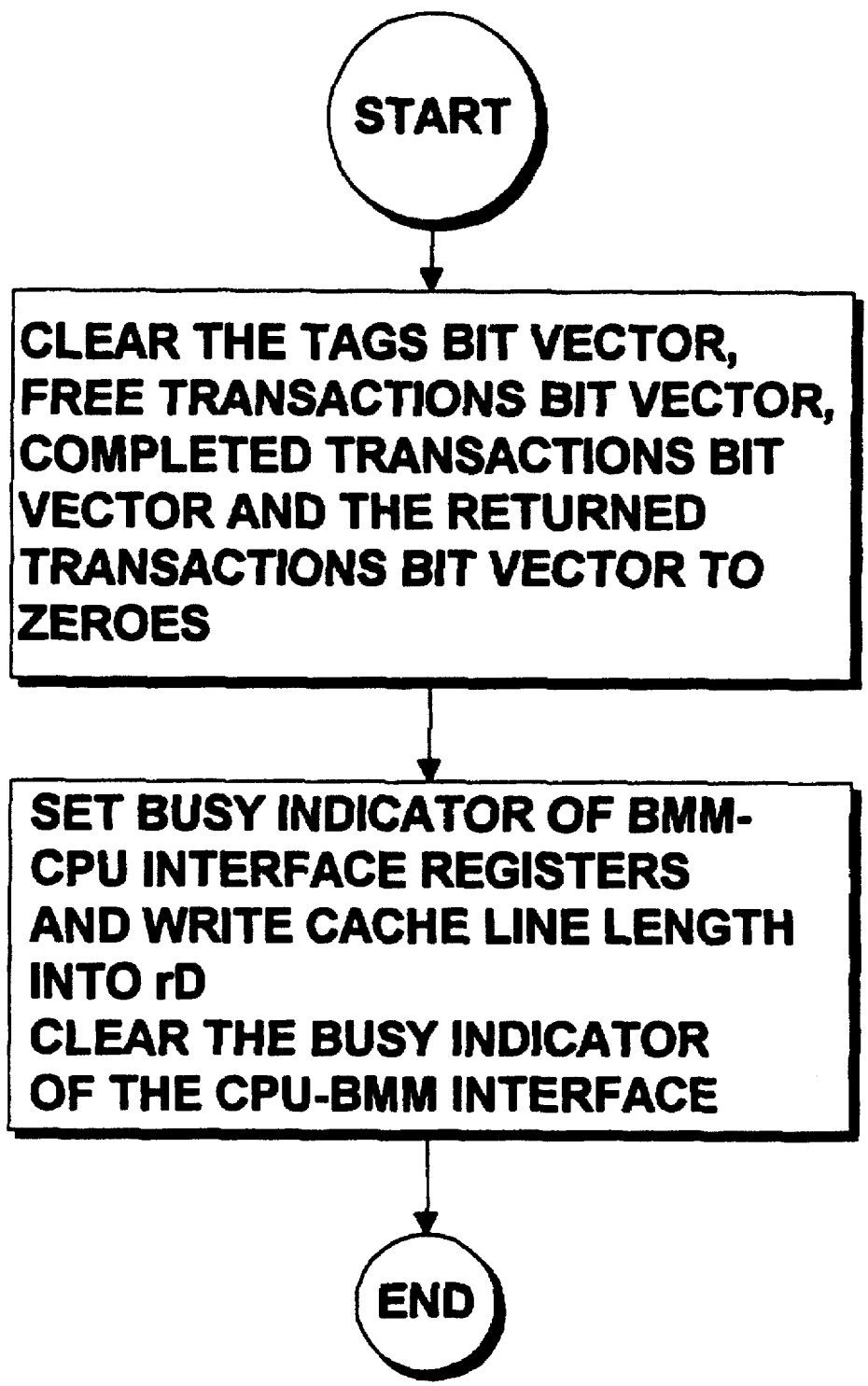
Figure 6B:
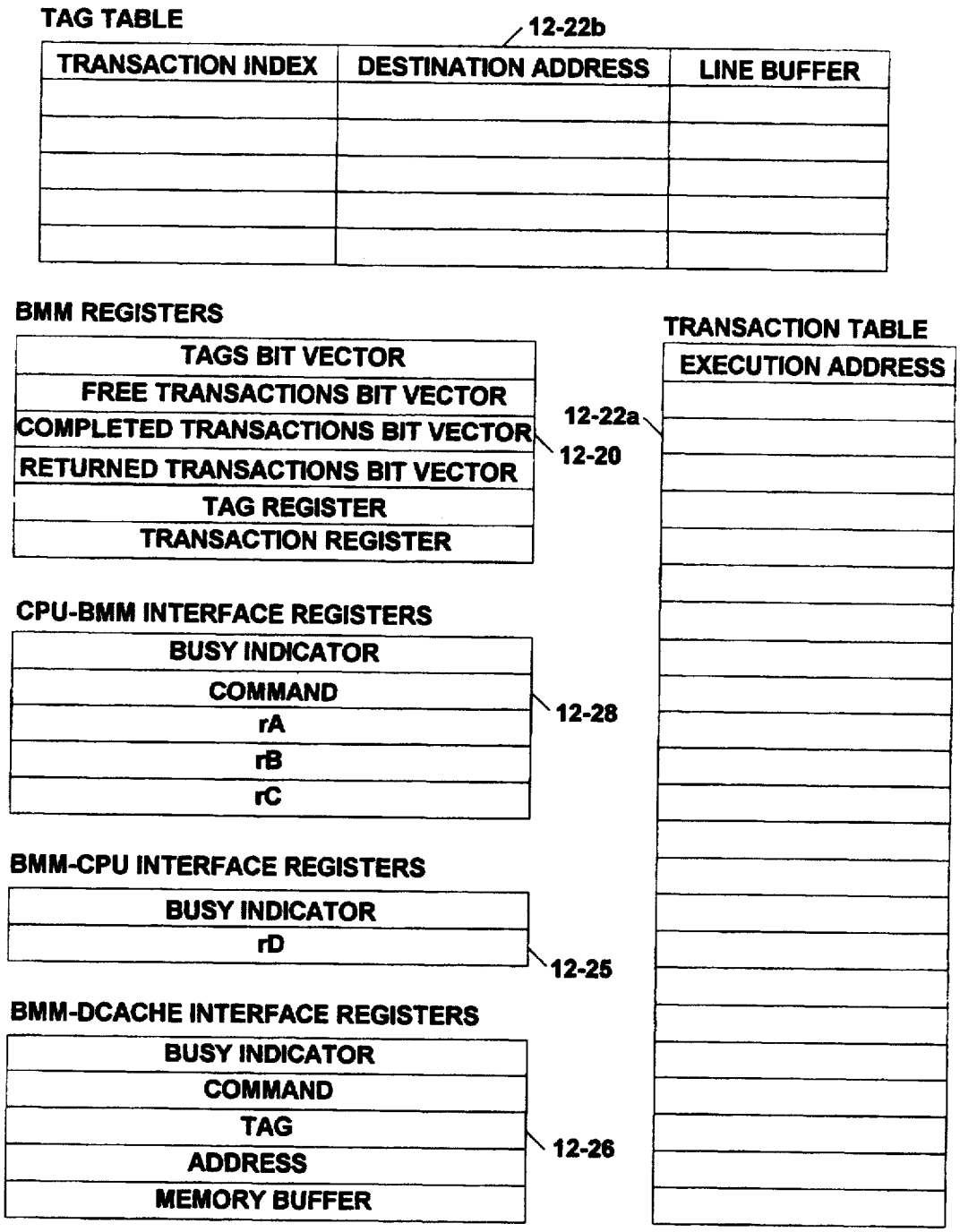
Figure 7:
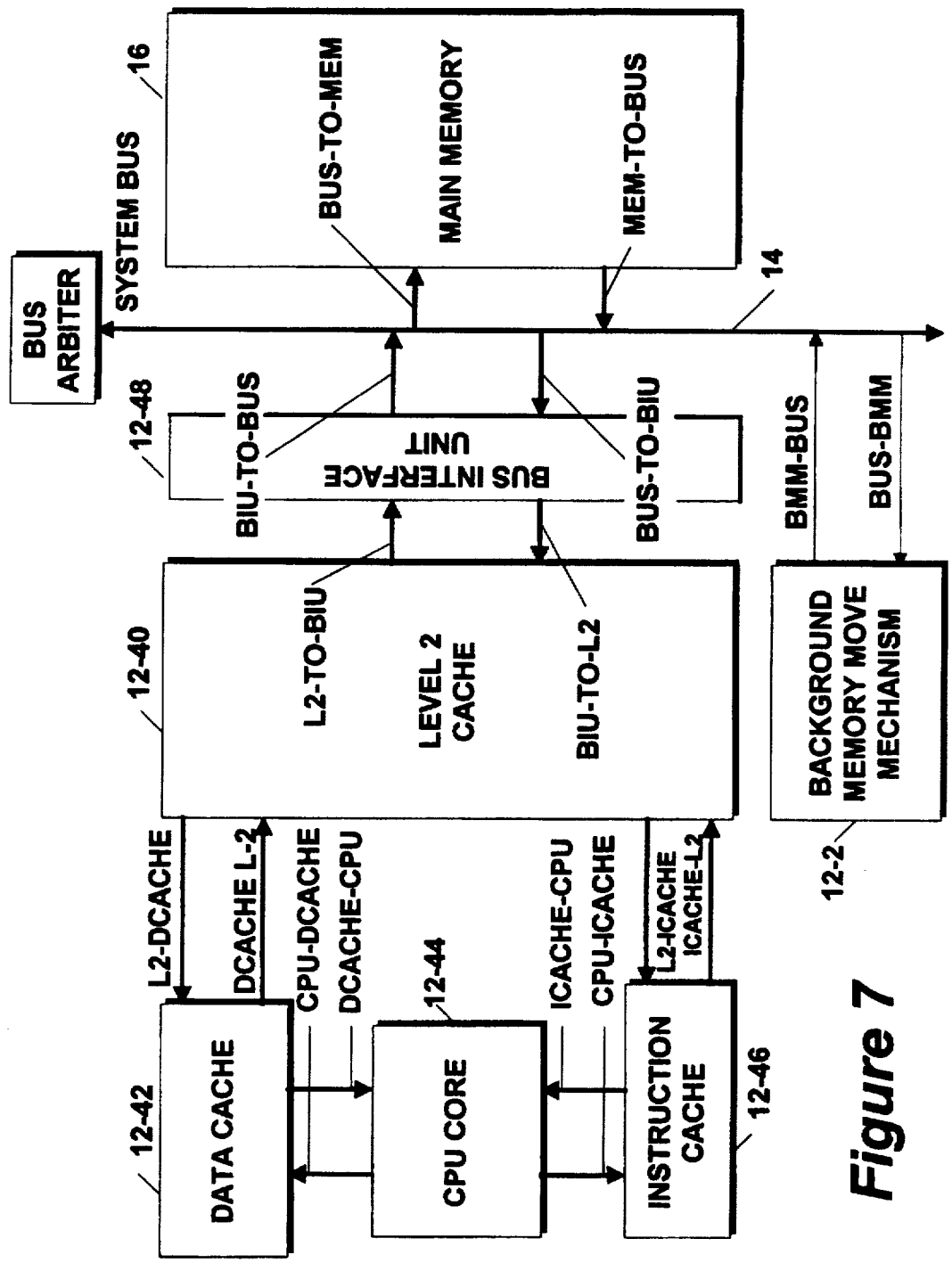
FIG. 7 illustrates an alternate embodiment of a computing system wherein the background move mechanism of the present invention is implemented as a bus resident memory-mapped device.

In response to the init command, the BMM 12-2 performs the operations of FIG. 6a which included clearing all the bit vectors registers 12-20 of FIG. 6b. The BMM 12-2 replies to the processor 12-44 by providing a transfer size value specifying the number of bytes transferable by the natural transfer width of the memory system 16 (i.e., block 110 of FIG. 10). The processor 12-44 writes the value into the interface register specified by the rd field of the instruction by placing appropriate values on the signal path labeled BMM-CPU in FIG. 3a.

Set Up

Figure 10:
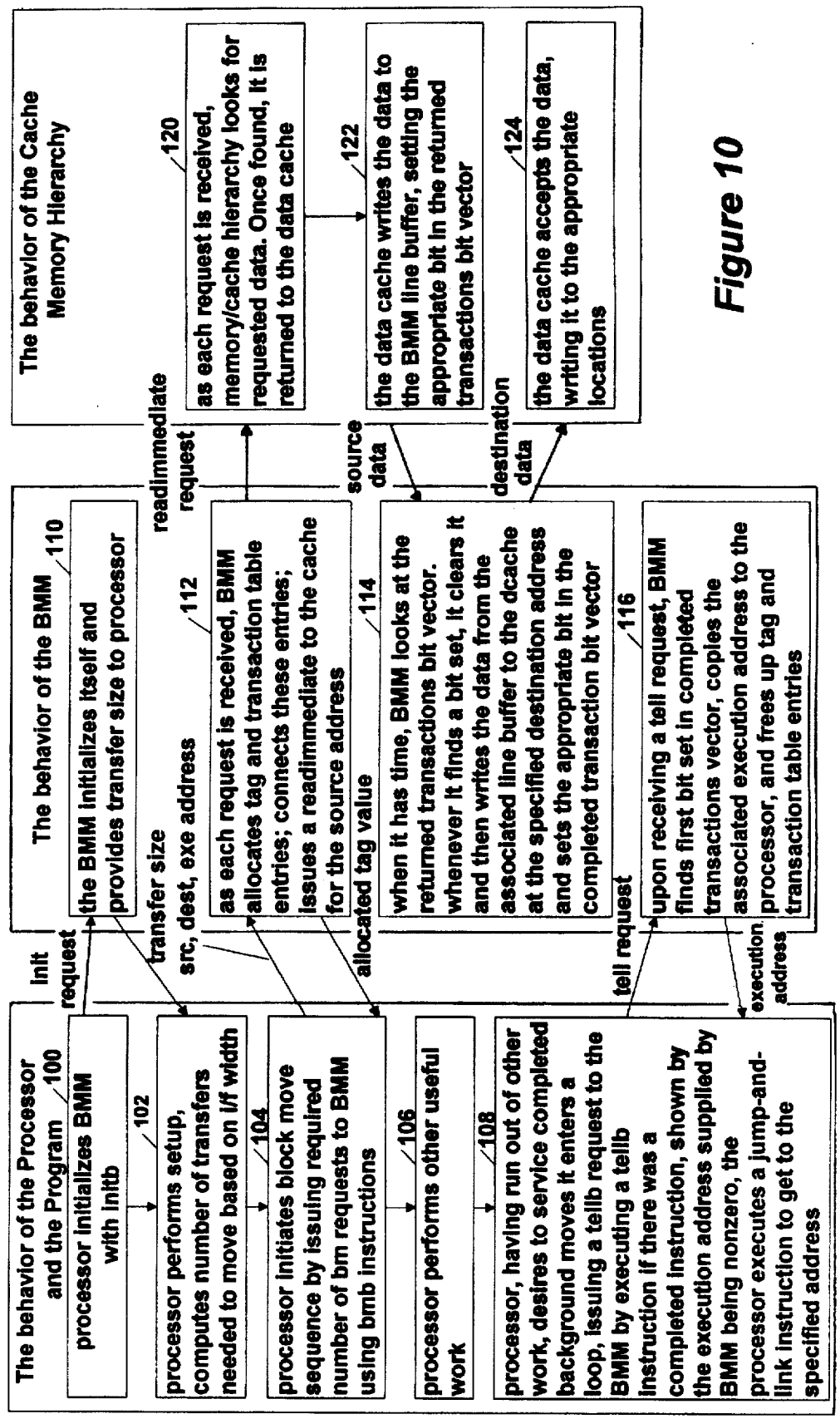
FIG. 10 is a flow chart which summarizes the actions of the main components of the system in carrying out a background move operation.

Next, as indicated in block 102 of FIG. 10, the processor 12-44 prepares for the particular background move by first computing the number of transfers required. This value may be obtained by dividing the received value corresponding to the number of bytes to be moved by the natural transfer width of the memory system 16.

Background Block Move

As indicated in block 104 of FIG. 10, the processor then executes a sequence of background block move instructions, each having the format bmb rd, rs1 , rs2. FIGS. 6c-1 and 6c-2 provide program examples of such background moves. In the first example depicted in FIG. 6c-1, the number of bytes being moved by the BMM 12-2 equals the length of a Dcache line. In the second example depicted in FIG. 6c-2, the number of bytes being moved by the BMM 12-2 is a multiple of the Dcache line length. Therefore, several background moves are required.

As previously described, each bmb instruction executed by processor 12-44 results in a initBlockMove command being passed to the BMM 12-2 causing it to initiate a separate background move operation as indicated in block 112 of FIG. 10. As each bmb instruction of FIG. 6c-2 is executed by processor 12-44, the value in the processor register specified by the rd field of the bmb instruction is copied to the BMM's rC interface register 12-28, the processor register specified by the rs1 field is copied to the BMM's rA interface register 12-28 and the value in the processor register specified by the rs2 field is copied into the BMM's rB interface register 12-28. As indicated in block 106 of FIG. 10, after performing such sequence, the processor begins performing other useful work.

Also, in response to each initBlockMove command, the BMM 12-2 allocates a tag entry and allocates a transaction entry as previously described (see FIGS. 5a-2 and 5b-2). Assuming that both tag and transaction were allocated, next, the BMM 12-2 connects the tag table entry to the transaction table entry as previously described (see FIG. 5c-2). Next, the BMM 12-2 initializes the transaction as previously described (see FIG. 5d-2).

The BMM 12-2 then signals the Dcache 12-42 to execute a 'ReadImmediate' command along with sending the address as specified in register rC of interface 12-28 and the tag the value in the tag register 12-20. As indicated in block 120 of FIG. 10, upon recognizing the request, the data cache 12-42 will look up the address inside itself as usual, passing the request on to the L2 cache 12-40 of FIG. 3a as usual if it does not contain the address requested. The request, as it is passed along, retains the ReadImmediate command and the tag provided by the BMM 12-2. Again, the L2 cache 12-40 will return the value if it is held within the L2 cache 12-40. If it does not have the requested value, it will pass the BMM request on to the main memory 16 via the BIU 12-48 and Bus 14.

The memory system 16 will see that the command asking for the data was a ReadImmediate command and will appropriately mark the returning values in accordance with such command coding so that as the appropriately tagged information propagates back to the BMM 12-2 via the L2 cache 12-40 and the Dcache 12-42. Normally, such marking will specify that no encaching take place and therefore, neither the L2 cache 12-40 nor the Dcache 12-42 makes any change to their contents.

When the command to the Dcache 12-42 has been issued, the BMM 12-2 passes back the value of the tag table entry selected for the transaction or the value −1 if it was not possible to allocate both a tag and a transaction entry. The processor 12-44 takes this value and writes it into the processor register specified by the rd field of the bmb instruction, enabling subsequent instructions to discover whether the background move request succeeded. The act of providing the tag value to the processor 12-44 completes the BMM's operation and it is free to await receipt of further requests and returning values from the memory system 16.

In the manner described above in the section entitled Dcache-BMM Communication, eventually the Dcache 12-42 will return the value received from memory system 16 to BMM 12-2, writing the value into the appropriate line buffer possibly in parallel with other processor or BMM activities and setting the appropriate bit in the returned transactions bit vector (i.e., block 122 of FIG. 10). At this time, the BMM 12-2 will service the returned transaction as indicated in block 114 of FIG. 10.

Servicing a Returning Memory Transaction

More specifically, the presence of set bits in the returned transactions bit vector contained in the returned transactions vector register of FIG. 4a serves an indicator to the BMM state machine 12-24 that the BMM 12-2 has internal work to perform. On a clock interval when there are one or more bits set in this vector, the BMM 12-2 will complete the transaction as follows.

It first confirms that the BMM-Dcache interface 12-26 is free by checking the state of the interface's busy indicator register. If so, BMM 12-2 proceeds as follows. First, it finds the highest bit set in the returned transactions bit vector register of FIG. 4a and copies this value into the tag register. It then clears that bit in the returned transaction bit vector register and indexes into the tag table 12-22b with the value in the tag register. Next, as indicated in block 114 of FIG. 10, BMM 12-2 reads the destination address from the destination address field of the tag table entry and writes the destination address into the address register of the BMM-Dcache interface 12-26. Also, it copies the data values contained in the line buffer field of the tag table entry into the buffer register(s) of the BMM-Dcache interface 12-26. It then writes the command WriteLine to the command register of interface 12-26 and sets the interface's busy indicator register to a binary ONE state. Finally, it indicates the completion of this transaction by setting a bit in the completed transactions bit vector; the bit set is the one specified by the value of the tag register.

As indicated in block 124, the above operations result in the proper storage of the information in the Dcache 12-42 obtained from the background move operation thereby making it readily available to the processor 12-44 as discussed herein.

Requesting a Tell

Eventually, as indicated in block 108 of FIG. 10, the processor 12-44 will stop initiating requests and begin its processing of results of those bmm instructions that it has already requested. It does this by executing a tellb rd, rs1, rs2 instruction asking the BMM 12-2 for the next completed transaction.

As indicated in block 116, upon receiving the tellExec command, the BMM 12-2 copies the register value (i.e., rs2) passed into the rA register by processor 12-44 and then searches the bits of the completed transactions bit vector register.

If it finds a bit which is set to a binary ONE, BMM 12-2 copies the bit index value into the BMM transaction register. It indexes into the transaction table 12-22a using the transaction register index to identify the transaction table entry. BMM 12-2 copies the value of the execution address field of the particular transaction table entry into register rD of interface 12-25. It then clears the bits corresponding to the transaction table entry in both the free transactions bit vector and the completed transactions bit vector registers, thereby freeing up the transaction table entry.

If BMM 12-2 does not find a completed transaction vector bit set to binary ONE state, it writes the value zero to interface register rD. The BMM 12-2 then responds to the tellb instruction command by passing back to processor 12-44, the value in register rD which is either the desired execution address associated with the transaction or zero if no transaction was found. The processor then copies this value into the processor register specified by the destination field rd of the instruction and continues execution at the next instruction.

For ease of explanation, the present invention was previously described within the context of a simplified but traditional RISC-style processor. It will be appreciated by those skilled in the art that the invention may be added to other types of processor architectures with minor changes in the definition of the instructions while maintaining the essentials of a machine which can effect memory-memory moves in parallel with the processor and signal completion of such moves in an efficient and useful manner to the processor when it is ready to be so informed.

Adding the BMM to a non-RISC microprocessor

In this example the general structure of the system with the present invention therein integrated will be assumed to be that shown in FIG. 3a; the sole difference is in the definition of some slightly different instructions. For convenience, these instructions are also summarized in the Appendix.

As an example, there follows a description of the instructions that a simple accumulator-oriented processor architecture might implement to add the present invention. Such a machine has a very small number of registers and has instructions of the form operation register number, operand specifier in which the operand specifier may be a register, a constant, or a memory address.

In the present example, the processor is assumed to have just four registers, two of which are accumulator registers and the other two a stack frame pointer register and the program counter register. The operand specifier can specify a constant, another register or a value in memory specified by adding the operand field to the value specified in the stack frame register.

The example architecture could be adapted to implement the BMM by choosing instructions as follows. More instructions are required than for the RISC architecture example because the target architecture has fewer registers mentioned in each instruction. It will be seen that a very similar organization of instructions is possible, the only substantive difference being the necessity to implement the functionality of the bmb classic instruction as a sequence of instructions. It will be understood that the processor and the BMM communicate using the protocols and resources set forth earlier.

The following instructions are added to the processor's base instruction set according to the present invention.

The first instruction is a number of instructions required to initiate a background block move operation. These are of the form, bmb.dest rd, operand, bmb.exec rd, operand and bmb.src rd, operand. These first instructions are used in sequence to initiate a background move (i.e., copy) of a block of memory.

In the bmb.dest instruction, the operand field specifies an operand which contains the destination address for the move and the rd field specifies a register into which will be written the index of the tag table entry selected for this move. In the bmb.exec instruction, the rd field specifies the register which holds the index of the tag table entry for which the execution address is to be specified, and the operand field specifies an operand which contains the execution address for the move. In the bmb.src instruction, the rd field specifies the register which holds the index of the tag table entry for which the source address is to be specified, and the operand field specifies an operand which contains the source address for the move.

When the processor executes the bmb.dest instruction, it passes to the BMM 12-2, the value specified by the operand field together with a BMM command initBlockMove. Upon receiving the init command, the BMM 12-2 tries to allocate a free tag table entry and a free transaction table entry. If it succeeds, the BMM 12-2 "connects" the selected table entries and initializes their fields appropriately from the values given to it by the processor 12-44. In particular, the BMM writes the received destination address into the selected tag table entry. The BMM then returns the index of the selected tag table entry or the value −1 if the allocation could not be done. The processor 12-44 writes the returned value into the register specified by the rd field.

When the processor 12-44 executes the bmb.exec instruction, it passes to the BMB 12-2, the values held in the register specified by the rd field and the operand specified by the operand field. The BMM 12-2 then selects the transaction table entry specified by the tag table entry selected by the value in the register specified by the rd field, and writes into that transaction table entry the value specified by the operand field.

When the processor 12-44 executes the bmb.src instruction, it passes to the BMB 12-2 the values held in the register specified by the rd field and the operand specified by the operand field. The BMM 12-2 then selects the tag table entry selected by the value in the register specified by the rd field.

The BMM 12-2 then issues a read immediate command to the memory system 16 through its interface to the main memory system 16 (i.e., Dcache 12-42). The ReadImmediate command has as a tag, the index of the selected tag table entry and specifies the source address provided by the bmb.src instruction.

The second instruction is an initialize background move machine instruction having the form initb rd, operand. This instruction is used to initialize the BMM 12-2 prior to use. The processor 12-44 in response to executing the instruction passes a command initBMM to the BMM 12-2. The BMM 12-2 in response to such command, then initializes itself and the contents of its tables and passes back to the processor 12-44, a value which specifies the number of bytes transferred by a bmb instruction. The processor writes this value into the register specified by the rd field.

The third instruction is a next completed transaction instruction having the form tellb rd, operand. This instruction is used by processor 12-44 to discover a location at which instruction execution should continue. The processor 12-44 in response to this instruction, provides a command tellExec to the BMM 12-2 causing it to find the first completed transaction, extract the execution address from the transaction table, free the transaction table entry, and pass the address back to the processor 12-44. If there were no transactions completed, the BMM 12-2 provides the address zero. The processor 12-44 then writes the execution address into the register specified by the rd field.

The fourth instruction is a number of completed transactions instruction having the is form countbd rd, operand. This instruction is used by processor 12-44 to discover how many requested transactions have completed but have not been serviced by the processor 12-44. The processor 12-44 in response to this instruction, provides a command tellCount to the BMM 12-2 causing it to count the number of completed but unserviced transactions and provide the count value to the processor 12-44. The processor 12-44 then writes the count into the register specified by the rd field.

The fifth instruction is a number outstanding transactions instruction having the form countbo rd, operand. This instruction is used by processor 12-44 to discover how many transactions have been requested but have not been serviced by processor 12-44 or which have not yet completed. In response to this instruction, processor 12-44 issues a command tellCountO to the BMM 12-2 causing it to count the number of transactions and provide the count value back to the processor 12-44. The processor 12-44 then writes the count value into the processor register specified by the rd field.

Memory-Mapping the BMM

Another method of attaching the BMM 12-2 to an existing microprocessor which is much less invasive is to memory-map the interface and place the BMM on the system bus. This allows a BMM to be provided as an add-on to existing implementations already deployed. While the interface will be less efficient, no changes are needed to the subject microprocessor (beyond the writing of appropriate software) provided it can support the usual behaviors of a cache-coherent multiprocessor.

In a simple version of a memory-mapped attachment, the system reserves a block of main-memory addresses to reference the BMM 12-2 rather than main memory, and the BMM 12-2 is attached to the system in parallel with and sharing the same interface as the main memory system.

There are then several ways of implementing the interface. One simple approach is to specify that each address in the block reserved for the BMM means a different interface request. In this simple scheme, an instruction which stores a value to an address may either transfer a value to the BMM 12-2 or instruct it to act. In such a scheme, the number of addresses allocated for the BMM interface would be sufficient to provide 8 addresses for each of the possible transactions, so that if the BMM 12-2 were capable of housekeeping 64 transactions there would be at least 8*64 addresses allocated to the BMM interface.

FIG. 3b shows a computing system with a bus-resident memory-mapped BMM 12-2. In operation, the system works generally as described earlier for the normal computing system, except that loads and stores whose addresses refer to the BMM 12-2 will be caught (i.e., intercepted) from the bus and serviced by the BMM 12-2 rather than the main system memory. In the example implementation described here, addresses 1000000–1000512 address the BMM 12-2 rather than main memory. The choice of such address ranges will depend on the constraints of the system. It is assumed in this example that there may be no more than 32 tags or transactions; increasing the number requires allocating a larger address range.

A representative implementation of such an interface is as follows:

store rd, 1000000;

get index; a free tag and transaction are claimed; the tag destination field is filled with the value in register rd; the register specified by the rd field is then filled with the index of a free transaction table entry or −1 if none is available;

store rd, 1000064+t;
give execution address; the transaction whose index is t has its execution field set to the value in the register specified by rd
store rd, 1000128+t,
give destination address; the transaction whose index is t has its destination field set to the value in the register specified by rd;
store rd, 1000256+t;
background block move; the transaction whose index is t is caused to start with a source address of the value in register rd;
load rd, 1000002;
initialize background move machine; the register specified by the rd field will be filled with the natural transfer size of the memory system for the transaction whose index is t.
load rd, 1000004;
ask the BMM for the next completed transaction so that execution may continue at the specified address. The register specified by the rd field is loaded with the address of the next instruction.
load rd, 1000008;
ask the BMM for the number of requested transactions which have completed but have not been serviced. The register specified by the rd field is loaded with the number of completed but unserviced transactions.
load rd, 1000016;
ask the BMM for the number of requested transactions which have neither completed nor been serviced. The register specified by the rd field is loaded with the number of uncompleted and unserviced transactions.

Using the memory-mapped bus-resident BMM

The BMM described here may be used as indicated in other portions of this specification with the extra steps needed to ensure that the portions of memory to be moved are represented coherently in the caches and memory.

Before use, the processor must reference sufficient addresses in each destination block to ensure that the cache hierarchy contains entries for these values. The processor can ensure this either by the careful structuring of the program or by flushing the caches and invalidating any such addresses such that the source addresses are not cached. When the BMM 12-2 performs the move, the cache hierarchy will watch the transfers and arrange that the caches contain the correct destination values.

Writing Programs that Use the BMM (i) Invoking Use of the BMM

In principle, modern compilers might be able to decide which memory accesses should be given to the BMM and which should be done by the native processor. They could do this by indicating or noticing which data structures seemed to be large and to have access patterns which would damage cache contents.

However, it might be simpler to have the programmer help the compiler by indicating which structures should be handled by the BMM. In a programming language such as C++, this may be done by adding an annotation to an otherwise normal program to indicate that a data structure or a body of code should use the BMM. It will be appreciated that the compiler would need to be appropriately modified to understand and act on the annotation.

Figure 8:
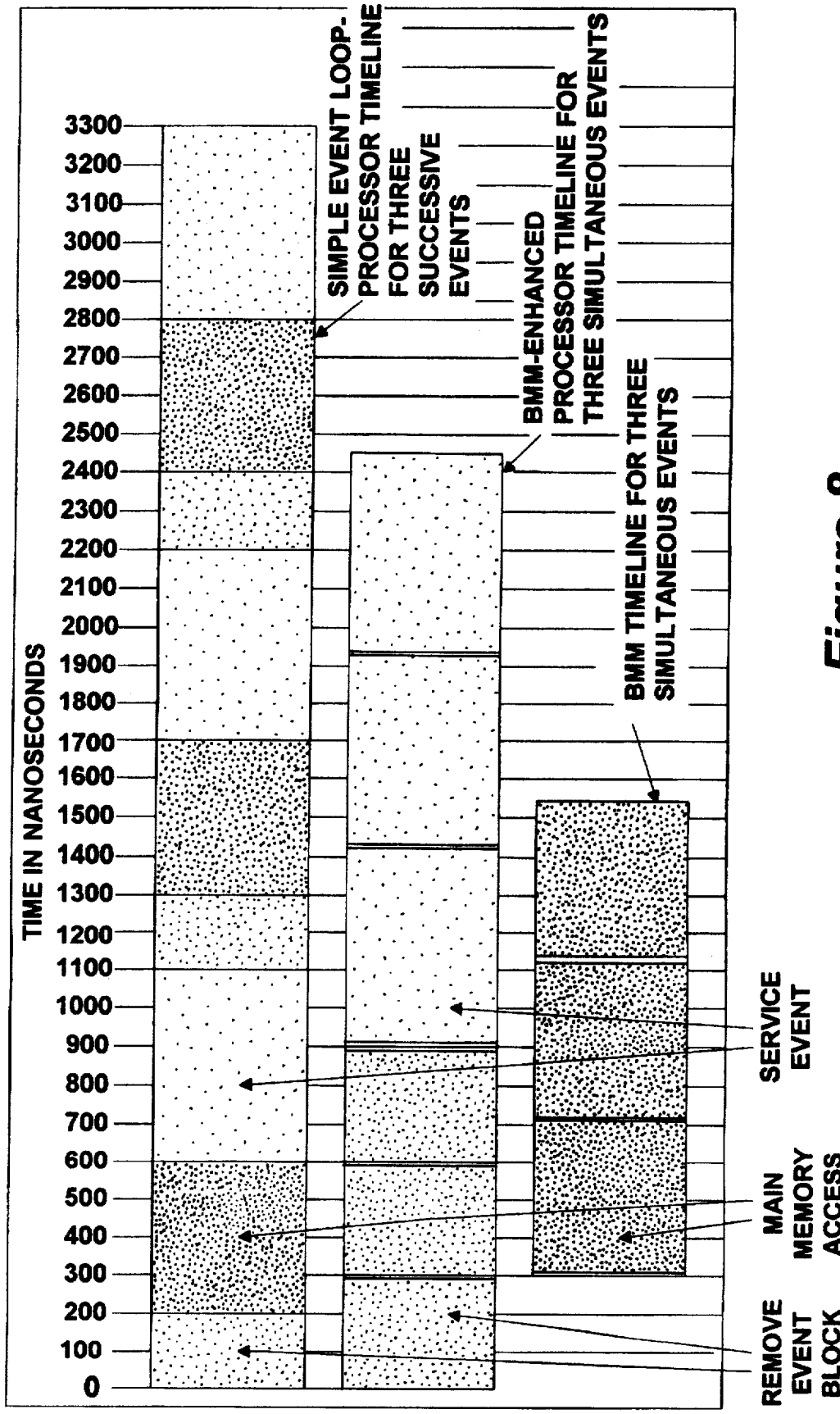
FIG. 8 is a timeline diagram for illustrating the performance advantages of the present invention.

More specifically, by way of example, the code below could be used to declare to such an appropriately modified compiler that inside procedure mpeg(), accesses to the data structure source should be handled by the BMM wherein the standard hint-providing keyword pragma is used to indicate the hint sparse.:

void mpeg(pragma sparse int16* source, int16 *dest);

(ii) Making use of the BMM-FIG. 8

The BMM may provide a performance benefit when operations must be performed upon multiple data structures which together are too large to fit in the cache hierarchy.

An example of this situation is a discrete event simulation of a large and complex system. In such a simulation, the components of the system are each represented by a data structure, which may be large. The behavior of the system components, to be amenable to this style of simulation, must be such that it may usefully be approximated by assuming that the behavior changes only at discrete time intervals. The system behavior is then modeled by writing program code which models the behaviors and transitions for each component and which builds a time-ordered queue of the data structures representing the states of the components. As the simulation progresses, the first data structure in time order is removed from the queue and its associated code executed; the model time is set to the time for which this event was intended. Generally, servicing the event has the effect of modifying the data in the data structure and causing it to be re-enqueued for a later time. Frequently, it is found that several data structures at the head of the queue have the same event time; therefore, they could be executed concurrently, or at least in any convenient order.

The cyclic behavior of such a simulation (i.e., read a data structure, write to it, and then read another structure and write to it) can cause poor cache behavior. If the data structures are large, and there are many of them, the servicing of one event will frequently cast the encached values of another event out of the cache. When this happens, servicing that data structure first will require that the cache be reloaded from main memory, reducing performance sharply below what the system could sustain if all data was in cache.

The BMM can improve performance in such a system as long as there are multiple simultaneous events.

The BMM can be used as follows. It will be assumed that the simulation system uses small fixed-size blocks to represent the events, each block containing its event time, necessary queue pointers and a pointer to the associated model data structure.

The classic simulator uses an 'event loop' of the following form:

```
frag 1 {
    take the first event block off the queue
    set the model time to the time in the event block
    execute the code associated with this event
}
```

When it is a frequent case that several event blocks have the same event time, the loop may be modified to first remove all the event blocks of the same time from the main event queue and to place them on a new auxiliary queue, the immediate queue. The pseudocode then takes the following form:

```
frag 2 {
    take the first event off the queue and place it on an immediate queue
    set the model time to the time in this event block
    look at the next event
    while (time of this event is the same as model time) {
        take this event off the queue and place it on the immediate queue
        look at the next event
    }
```

```
for each event on the immediate queue {
    execute the code associated with this event
    }
}
```

When there are a large number of events, this loop may not perform well because the cache will be too small to accommodate all the events and their associated data. For illustration, assume that there are 25,000 different events alive on average (that is, there are on average 25,000 events on the event queue) and that each event is represented by a 128 byte data structure. If the cache line size is 32 bytes, then this population of events represents a working set of about 3 megabytes. If the processor has a cache size of just one megabyte, each complete run through the event list will likely empty the cache of useful data; as the processor accesses the event block at the head of the event queue, it will likely discover that the block is not encached, having been displaced by accesses to another block.

The BMM may be used to improve performance of the event loop. The general approach is to break the event block data structure up into two portions; one portion is basically the event queue housekeeping and the second represents the event-specific data. The event queue housekeeping data structure consists of a pointer to the next event, a pointer to the event data and a field representing event time; this is 24 bytes of information on a 32-bit machine and the 25,000 events fit well in the megabyte of cache, taking just 600KB, but the 25,000 pieces of event specific data will not fit.

The BMM may then be used to improve performance by having the processor identify the events at the head of the queue which share a common event time, as before, and to use the BMM to move the events' associated data into private buffers in the background. The general scheme is then as shown below at a high level:

```
frag 3 {
    take the first event off the queue and place it on an immediate queue
    set the model time to the time in this event block
    look at the next event
    while (time of this event is the same as model time) {
        take this event off the queue and place it on the immediate queue
        ask the BMM to move the associated data to a local copy
        look at the next event
        }
    while there are BMM transactions unserviced {
        for each completed transaction {
            execute the code for this event, using the local copy
            copy the data back to the real data structure
            }
        }
    }
```

Using the BMM mechanism, the designer first determines a maximum number of events to hold on the immediate queue, and creates that number of private buffers, each large enough to hold the data associated with an event (in this case about 32 bytes). By way of example, it is assumed that the number of private buffers is 8, the operation of the simulator with the use of the BMM is given by:

```
frag 4 {
    take the first event off the queue and place it on an immediate queue
    ask the BMM to move the associated data to buffer[0]
    set the model time to the time in this event block
    look at the next event
```
    set count to 1
    while (time of this event is the same as model time and count <8 or fewer events on the immediate queue) {
        take this event off the queue and place it on the immediate queue
        ask the BMM to move the associated data to buffer[count]
        count = count + 1
        look at the next event
        }
    while there are BMM transactions unserviced {
        for each completed transaction {
            execute the code for this event, using the local copy
            copy the data back to the real data structure
            }
        }
}
```

It can be seen from FIG. 8 that the present invention provides a performance enhancement when there is more than one entry on the immediate queue. More specifically, FIG. 8 shows a timeline of activities in the two cases of the simple simulation event loop and the improved one making use of the BMM 12-2. In the Figure, the assumptions made for purpose of exposition are that the processor 12-44 executing the program can execute one instruction every 10 nanoseconds, provided that the instruction is not a load instruction, and that a load, if satisfied from the data cache 12-42 takes 10 nanoseconds, from the L2 cache takes 80 nanoseconds and from main memory takes 400 nanoseconds. Further, it is assumed that the data associated with an event is 32 bytes, which is the size of a cache line and the amount of data that main memory provides in one transaction, that the average number of instructions needed to service an event is 50 instructions and that the event loop takes 20 instructions per event in the simple case and 40 instructions in the case of using the BMM 12-2, split into 30 instructions associated with enqueuing the events on the immediate queue and 10 instructions for servicing the transactions. Finally, it is assumed that in both cases, the event blocks are always cached and the associated data is never cached.

The timeline of FIG. 8 for the simple case is built by considering the event loop, which takes the standard 20 instructions and which then branches to the code to deal with the associated data. This code is assumed to start with a load instruction referencing the associated data; this load will miss in the cache and be satisfied from main memory, and so it will be 400 nanoseconds before the data is available. When the data does arrive, the code executes 50 instructions. This totals 20*10+400+50*10, or 1100 nanoseconds.

The timeline of FIG. 8 for the BMM case assumes that there are three simultaneous events. To service the first one takes 30 instructions, including the request to the BMM. By the time that the three events have been placed on the immediate queue and 3×30×10 (i.e., 900) nanoseconds will have passed. By this time, the first BMM transfer will have completed, and so its code will be executed, taking another 50×10 nanoseconds bringing the time elapsed to 1400 nanoseconds. By this time, at least the second BMM transaction will have completed, and so its event servicing may complete in another 500 nanoseconds, taking elapsed time to around 1900 nanoseconds. By this time, the final BMM transaction will have completed, and so again its associated code may be executed in a further 500 nanoseconds.

Thus, as indicated in FIG. 8, using the BMM mechanism results in three events being serviced in 2490 nanoseconds, while the simple event loop would have required 3300 nanoseconds for the same work.

From the above, it is seen how the BMM mechanism of the present invention improves the performance of a state of the art computer system. It will be appreciated that many changes may be made to the preferred embodiment of the present invention without departing from its teachings. As discussed, the present invention may be used in combination with a variety of different types of system architectures, several of which have been described above. The following describes several extensions which may be made to the BMM mechanism of the preferred embodiment.

BMM Mechanism Extensions

The BMM mechanism of the preferred embodiment was described as operating in the environment of a uniprocessor system. The mechanism may be extended to operate correctly in an SMP (Symmetric MultiProcessor) system in which the multiple caches and the memory system are kept coherent through the use of some appropriate coherency protocol and interconnect.

(i) a BMM which works within an SMP system

The BMM would be used in situations wherein the source data is not cached, but the copies are cached. The source data may therefore be used safely in a cache-coherent SMP system by marking in the normal manner, those areas of memory which contain the source data as non-cachable. It is intended further that in general, the copied data is private to the processor owning the particular data cache in question. Given these two constraints the BMM mechanism as described may be safely and efficaciously used in an SMP system.

In some circumstances, it may be preferred to share the copied data between the multiple processors. In this circumstance, provided that the area of memory used for the copied data is appropriately marked as sharable and coherent, once the data has been copied to the data cache, the system's normal coherence mechanisms will keep it sharable and coherent.

Thus, the simplest means by which the BMM may be used in an SMP system is to follow the normal methods for sharing data. One way of doing this is to associate a lock with each destination buffer. Before the data has been copied to the buffer, the lock is marked FALSE; once the data has been copied safely, the lock is set TRUE. In addition, each such buffer has associated with it a counter which is initialized to zero prior to the use by any processor of that buffer. The counter is incremented by one by each processor using the buffer while that processor is using the buffer and decremented by one by the processor upon finishing its use of the buffer. Any processor wishing to manipulate the data must wait for the lock to be TRUE. Any processor wishing to overwrite the copied data with new data from elsewhere must set the lock to FALSE and then wait until there are no processors using the buffer (indicated by the counter becoming zero). The processor may then cause the BMM to copy new data to the buffer. The manipulations of the lock and the counter must be done in accordance with the system protocols to ensure multiprocessor correctness in those manipulations.

The BMM as described in the preferred embodiment, copied one line of data for each request. By use of appropriate software sequences, as shown in the example code, the BMM may be used to copy multiple lines of data through multiple requests. Software can make this operation look very much as though the BMM itself was able to move multiple lines with one request. But the cost of this abstraction is that the processor must execute software to keep track of the number of copies completed. Thus, it may be more convenient to have a BMM which is capable of moving multiple lines of data itself (ii) A BMM capable of moving multiple lines of data per request The BMM described may be extended to provide this capability as follows. It will be understood that the description applies to the implementation of the BMM described as appropriate for addition to a RISC-like processor architecture. Equivalent expansions may be made for alternate use environments.

As illustrated in FIG. 9a, first, the transaction table 12-22a is given another column so that each entry in the transaction table has two fields, one the execution address as before and the other a new field, the transfer count. Second, the tag table 12-22b is also given another column so that each entry in the tag table now has four fields. The new field is used to hold the source address of a background copy.

Third, the instruction repertoire is extended to include sixth and seventh new instructions, bmbi rd, rs1, rs2 and bmbm rd, rs1, rs2 respectively. The bmbi instruction operates precisely as described for the instruction bmb, except that it does not initiate the transfer but simply sets up the BMM internal resources as described and provides back to the processor, the index of the chosen tag table entry. In addition to this, the bmbi instruction also causes the specified source address to be placed in the source address field of the tag table entry selected.

The bmbm instruction takes the tag table index stored in rs1 and the number of transfers desired stored in rs2 and upon execution by the processor, the BMM will identify the transaction table entry selected by indexing the tag table by the value stored in rs1, and will then write the desired count into the transfer count field of the identified transaction table entry. The BMM will then initiate the transfer by issuing one read immediate command request to the memory subsystem in the manner previously described.

When the request is completed (i.e., in the sense that the requested line arrives back at the BMM), the BMM will service the returned value in the normal manner, copying it to the Dcache as usual; except that it will not free up any table entries and will not indicate in the bit vectors that the transfer has completed. After doing this, the BMM will identify the transaction table entry involved in the transfer and will decrement the transfer count by one. If the count is still non-zero, the BMM will increment the source address in the tag table by an amount equal to the BMM transfer width, and then issue another ReadImmediate command to the memory subsystem.

Eventually, the count will become zero whereupon the BMM will mark the transaction as completed by setting to TRUE, the appropriate transaction bit vector element. The tag table entry will then be freed. The transaction table entry will be freed in the normal manner when the software has executed a tellb instruction which chooses this transaction.

This multiple transfer mechanism can be made more efficient by providing more buffer capacity either in the tag table or elsewhere. If instead of one line's worth of data the line buffer in the tag table were to have sufficient capacity as for example, four lines, the BMM could issue four read immediate command requests upon initiation, presumably to multiple memory banks, and thereby maintain a higher bandwidth of traffic with the memory system.

FIG. 9a illustrates an alternative means of having the BMM provide multiple-line transfers by simply increasing the size of the tag table and allocating multiple entries for a multiple-line transfer. In this case, the definition of the extra instructions and of the operation of the BMM is slightly different. A suitable definition would involve the use of a different sixth new instruction, bmbme (for 'multiple entry') and a seventh new instruction bmbmei (multiple entry initiate).

The bmbme rd, rs1, rs2 instruction would take the number of lines to be transferred stored in rs2 and would seek to allocate that number of tag table entries and the execution address stored in rs1. The BMM 12-2 would return to rd, a bit vector of the entries allocated so that the tag table could have up to 64 entries with a 64 bit processor. Only one transaction table entry of the transaction table would be allocated for the whole multiple-line transfer, with each tag table entry indicating the same transaction table entry. The transaction table would have two fields, one being the execution address and the other being the bit vector of allocated tag table entries. The bmbmei rd, rs1, rs2 instruction would take in the source address stored in rs1 and the destination address stored in rs2, while having rd contain the bit vector of allocated tag table entries. From this information the BMM 12-2 can compute appropriate source and destination addresses for the tag table entries and fill in these values. The BMM 12-2 can then initiate the ReadImmediate commands to the memory subsystem.

As requests completed, the BMM 12-2 can copy them to the Dcache, freeing up tag table entries and clearing the bit in the transaction table bit vector corresponding to the tag table entry. When the bit vector became completely zero, the transfer has completed which the BMM 12-2 can indicate to the processor in the above described manner.

For clarity of exposition, the BMM 12-2 has been described as a separate subsystem alongside a traditional processor which is extended through the provision of some new instructions. It will be clear that an alternative implementation is possible in which the functionality and resources of the BMM 12-2 of the preferred embodiment is much more intimately wrapped into or integrated within the processor implementation. The details of such an implementation will differ according to the details of the base processor and matters of design choice taking into account speed, cost, etc.

(iii) Integration and Microcode Extensions

The BMM 12-2 of the preferred embodiment used a state machine readily implemented in direct hardware to provide control of the BMM resources and to effect the desired functionality. It will be clear that an equivalent implementation employing a microcoded implementation is equally feasible.

While in accordance with the provisions and statutes there has been illustrated and described the best form of the invention, still further changes may be made without departing from the spirit of the invention as set forth in the appended claims and that in some cases, certain features of the invention may be used to advantage without a corresponding use of other features.

APPENDIX

Instruction Definitions

I. Instruction Summary for the BMM for a RISC machine:
  a. bmb rd, rs1, rs2
   initiate a background block move from address rs2 to address rs1 with execution address rd
   if not accepted, rd=−1 upon completion, an illegal value for an index
   if accepted, rd=tag table index upon completion
  b. initb rd, rs1, rs2
   initialize the bmm
   contents of rs1, rs2, rd ignored on input
   rd=move line length upon completion
  c. tellb rd, rs1, rs2
   discover an execution address associated with a completed background move
   contents of rd, rs1, rs2 ignored on input
   if unserviced transactions exist, rd=execution address of a completed transaction upon completion
   if none exist, rd=0 upon completion, an illegal value for an execution address
  d. countbd rd, rs1, rs2
   discover how many transactions have completed but have not been serviced contents of rd, rs1, rs2 ignored on input
   rd=count of unserviced transactions upon completion
  e. countbo rd, rs1, rs2
   discover how many transactions are outstanding, (i e. requested but either not completed or not serviced as yet)
   contents of rd, rs1, rs2 ignored on input
   rd=count of outstanding transactions upon completion II. Instruction Summary of the BMM for a non-RISC machine:
  a. bmb.dest rd, operand
   set up the destination address for a background block move from address operand
   if not accepted, rd=−1 upon completion
   if accepted, rd=tag table index upon completion
  b. bmb.src rd, operand
   set up the source address for a background block move whose tag table index is rd, from address operand
  c. bmb.exec rd, operand
   set up the execution address for a background block move whose tag table index is rd, from address operand
  d. initb rd, operand
   initialise the BMM
   contents of rd, operand ignored on input
   upon completion, rd=block move length in bytes
  e. tellb rd, operand
   discover an execution address associated with a completed background move contents of rd, operand ignored on input
   if unserviced transactions exist, rd=execution address of a completed transaction upon completion
   if none exist, rd=0 upon completion
  f. countbd rd, operand
   discover how many transactions have completed but have not been serviced contents of rd,operand ignored on input
   rd=count of unserviced transactions upon completion
  g. countbo rd, operand
   discover how many transactions are outstanding, ie requested but either not completed or not serviced as yet
   contents of rd, operand ignored on input
   rd=count of outstanding transactions upon completion

I claim:

1. A method of improving the performance of a processor in executing instructions of a program, the processor having a base instruction set and including a cache hierarchy through which the processor operatively couples to a system memory used for storing program instructions and data, the method comprising the steps of:

(a) adding a background memory move (BMM) mechanism between the processor and cache hierarchy so that the BMM mechanism is able to copy sections of system memory into the cache hierarchy in parallel with normal processing operations;

(b) during the writing of the program, identifying those instructions whose accesses to system memory would cause cache access misses resulting in a decrease in processor performance which could be either reduced or eliminated by having the instructions executed some time prior to their natural position in the program;

(c) during program compilation, adding predetermined sets of instructions to points within the program associated with each of those instructions identified in step (b) for prefetching required data from system memory into the cache hierarchy through the BMM mechanism and for determining which prefetches have been completed; and, (d) augmenting the base instruction set of the processor for enabling decoding and execution of the predetermined sets of instructions added in step (c) for initiating and responding to background movements of system memory data through the BMM mechanism in parallel with executing program instructions for performing useful work.

2. The method of claim 1 wherein the cache hierarchy has a number of levels and wherein step (a) includes the step of integrating the BMM mechanism into the processor so as to include at least a lowest one of the number of levels of the cache hierarchy on a single chip for maximizing overall performance.

3. The method of claim 2 wherein the processor is a RISC based processor which operates in a uniprocessor environment.

4. The method of claim 2 wherein the processor is a processor which operates in a symmetrical multiprocessor environment.

5. The method of claim 1 wherein the BMM mechanism includes mechanisms to perform both single and multiple block move operations.

6. The method of claim 1 wherein each predetermined set of instructions added in step (c) includes:

instructions to initialize the BMM mechanism to a known state, to initiate different types of background move operations and to request the BMM mechanism to indicate completed background move operations.

7. The method of claim 1 wherein the BMM mechanism is organized to a number of resources which include:

first and second tables, the first table having a plurality of locations for storing a number of tag table entries corresponding to requested memory transactions which have not yet been completed, each tag table entry containing a first field for storing a transaction index value which specifies an entry in the second table, a second field for storing a destination address specifying an address into which the prefetched data returned from the memory system is to be written and a third field for storing the prefetched data returned from the system memory;

the second table, corresponding to the second table for storing transaction entries designating transactions requested of the memory system which has not yet been notified to the processor, each transaction entry having at least one field for storing an execution address specifying a point within the program where execution is to be resumed upon completion of a prefetch operation; and a plurality of registers operatively coupled to the first and second tables and being used for storing bit vector values used in managing resources defined by the first and second tables.

8. The method of claim 1 wherein the processor is a RISC based processor and the instructions of the predetermined sets of instructions include:

a first type of instruction coded for initializing the BMM mechanism to a known state;

a second type of instruction coded for initating a background move operation;

a third type of instruction coded for determining an execution address of a completed transaction; and, a fourth type of instruction coded for determining how many transactions have completed but have not been serviced by the BMM mechanism.

9. The method of claim 1 wherein the processor is a non-RISC based processor and the instructions of the predetermined sets of instructions include:

a first type of instruction coded for initializing the BMM mechanism to a known state;

a second type of instruction which corresponds to a sequence of instructions coded for initating a background move operation;

a third type of instruction coded for determining an execution address of a completed transaction; and, a fourth type of instruction coded for determining how many transactions have completed but have not been serviced by the BMM mechanism.

10. The method of claim 9 wherein the sequence of instructions coded for initiating a background move operation include:

a destination instruction designating the location of the destination address for the move and a register into which a first tag table entry index value selected for the move is to be written; an execution instruction specifying a register location of a second tag table entry index value for which an execution address is to be specified and an execution address value for the move operation; and a source instruction designating a register location which holds a third tag table entry index value for a source address to be specified and a source address value for the move operation.

11. The method of claim 1 wherein the cache hierarchy includes a number of levels of cache components and step (d) further includes:

augmenting the base instruction set to include the capability of generating a ReadImmediate command for enabling returned memory data from any read operation to be satisfied by memory system to be propagated back by the memory system without updating cache components of the cache hierarchy.

12. The method of claim 10 wherein the read command is formatted to include control information specifying the levels within the cache hierarchy that the returned memory data are to be encached.

13. The method of claim 10 wherein step (d) further includes augmenting the base instruction set to generate a Write line command for initating the writing of a complete data line into one of the levels of the cache hierarchy.

14. The method of claim 13 wherein the method further includes the step of:

(e) augmenting the cache components to respond to ReadImmediate and Write line commands issued by the processor.

15. The method of claim 13 wherein only the cache component of a first level is augmented for responding to Write line commands.

16. The method of claim 1 wherein the BMM mechanism is directly connected to the system memory.

17. Apparatus for improving the performance of a processor having a base instruction set and a cache hierarchy through which the processor operatively couples to a system memory used for storing instructions and data to be used by the processor in executing instructions of a program, the apparatus comprising:

a background memory move (BMM) mechanism coupled between the processor and the cache hierarchy so that the BMM mechanism is able to copy sections of system memory into the cache hierarchy in parallel with normal processing operations, and, the processor including apparatus augmenting the base instruction set for enabling decoding and execution of predetermined sets of instructions added to the program during compilation for prefetching required data from system memory into the cache hierarchy through the BMM mechanism and for determining which prefetches have been completed, the processor in response to instructions within the predetermined sets of instructions for initiating and responding to background movements of system memory data through the BMM mechanism in parallel with executing instructions of the program for performing useful work.

18. The apparatus of claim 17 wherein the cache hierarchy has a number of levels and wherein the BMM mechanism is integrated into the processor so as to include at least a lowest one of the number of levels of the cache hierarchy on a single chip for maximizing overall performance.

19. The apparatus of claim 18 wherein the processor is a RISC based processor which operates in a uniprocessor environment.

20. The apparatus of claim 18 wherein the processor is a processor which operates in a symmetrical multiprocessor environment.

21. The apparatus of claim 17 wherein the BMM includes mechanisms to perform both single and multiple block move operations.

22. The apparatus of claim 17 wherein each predetermined set of instructions added in includes:

instructions to initialize the BMM to a known state, to initiate different types of background move operations and to request the BMM to indicate completed background move operations.

23. The apparatus of claim 17 wherein the BMM mechanism is organized to include a number of resources which include:

first and second tables, the first table having a plurality of locations for storing a number of tag table entries corresponding to requested memory transactions which have not yet been completed, each tag table entry containing a first field for storing a transaction index value which specifies an entry in the second table, a second field for storing a destination address specifying an address into which the prefetched data returned from the memory system is to be written and a third field for storing the prefetched data returned from the system memory;

the second table, corresponding to the second table for storing transaction entries designating transactions requested of the memory system which has not yet been notified to the processor, each transaction entry having at least one field for storing an execution address specifying a point within the program where execution is to be resumed upon completion of a prefetch operation; and a plurality of registers operatively coupled to the first and second tables and being used for storing bit vector values used in managing resources defined by the first and second tables.

24. The apparatus of claim 17 wherein the processor is a RISC based processor and the instructions include:

a first type of instruction coded for initializing the BMM mechanism to a known state;

a second type of instruction coded for initating a background move operation;

a third type of instruction coded for determining an execution address of a completed transaction; and, a fourth type of instruction coded for determining how many transactions have completed but have not been serviced by the BMM mechanism.

25. The apparatus of claim 17 wherein the processor is a non-RISC based processor and the instructions include:

a first type of instruction coded for initializing the BMM mechanism to a known state;

a second type of instruction which corresponds to a sequence of instructions coded for initiating a background move operation;

a third type of instruction coded for determining an execution address of a completed transaction; and, a fourth type of instruction coded for determining how many transaction have completed but have not been serviced by the BMM mechanism.

26. The apparatus of claim 25 wherein the sequence of instructions coded for initiating a background move operation include:

a destination instruction designating the location of the destination address for the move and a register into which a first tag table entry index value selected for the move is to be written; an execution instruction specifying a register location of a second tag table entry index value for which an execution address is to be specified and an execution address value for the move operation; and a source instruction designating a register location which holds a third tag table entry index value for a source address to be specified and a source address value for the move operation.

27. The apparatus of claim 17 wherein the cache hierarchy includes a number of levels of cache components and the processor further includes:

apparatus augmenting the base instruction set to include the capability of generating a ReadImmediate command for enabling returned memory data from any read operation to be satisfied by memory system to be propagated back by the memory system without updating cache components of the cache hierarchy.

28. The apparatus of claim 27 wherein the read command is formatted to include control information specifying the levels within the cache hierarchy that the returned memory data is to be encached.

29. The apparatus of claim 27 wherein the processor further includes apparatus augmenting the base instruction set to generate a Write line command for imitating the writing of a complete data line into one of the levels of the cache hierarchy.

30. The apparatus of claim 29 wherein the cache hierarchy further includes apparatus augmenting the cache components to respond to ReadImmediate and Write line commands issued by the processor.

31. The apparatus of claim 29 wherein only the cache component of a first level is augmented for responding to Write line commands.

32. The apparatus of claim 17 wherein the BMM mechanism is directly connected to the system memory.

33. The apparatus of claim 23 wherein the BMM mechanism further includes a state machine for providing control of BMM resources used in initiating and processing background movements of system memory data requested by the processor.

34. The apparatus of claim 23 wherein the BMM mechanism further includes a microprogrammed machine for providing control of BMM resources used in initiating and processing background movements of system memory data requested by the processor.

* * * * *